US012695486B2

(12) United States Patent
Zhang et al.

(10) Patent No.: US 12,695,486 B2
(45) Date of Patent: Jul. 28, 2026

(54) HEXAGONAL ANTENNA LATTICE FOR MULTIPLE-INPUT, MULTIPLE-OUTPUT COMMUNICATIONS WITH BEAMFORMING

(71) Applicant: QUALCOMM Incorporated, San Diego, CA (US)

(72) Inventors: Danlu Zhang, San Diego, CA (US); Yu Zhang, San Diego, CA (US); Min Huang, Beijing (CN); Wei Xi, Beijing (CN); Chao Wei, Beijing (CN); Hao Xu, Beijing (CN); Allen Minh-Triet Tran, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 18/702,265

(22) PCT Filed: Dec. 30, 2021

(86) PCT No.: PCT/CN2021/142935
§ 371 (c)(1),
(2) Date: Apr. 17, 2024

(87) PCT Pub. No.: WO2023/123174
PCT Pub. Date: Jul. 6, 2023

(65) Prior Publication Data
US 2024/0413863 A1     Dec. 12, 2024

(51) Int. Cl.
*H04B 7/0456* (2017.01)
*H01Q 3/34* (2006.01)

(52) U.S. Cl.
CPC ............. *H04B 7/0456* (2013.01); *H01Q 3/34* (2013.01)

(58) Field of Classification Search
CPC .............. H04B 7/0456; H04B 7/06952; H04B 7/06956; H01Q 3/34; H01Q 1/246; H01Q 21/061
See application file for complete search history.

(56) References Cited

U.S. PATENT DOCUMENTS

| | | | |
|---|---|---|---|
| 6,504,517 | B1 | 1/2003 | Liu et al. |
| 2014/0073337 | A1 | 3/2014 | Hong et al. |

(Continued)

FOREIGN PATENT DOCUMENTS

| | | |
|---|---|---|
| CN | 110462431 A | 11/2019 |
| CN | 111834756 A | 10/2020 |
| WO | WO-2021142374 A1 | 7/2021 |

OTHER PUBLICATIONS

Intel Corporation: "Considerations on Performance Evaluation for NTN", 3GPP TSG RAN WG1 #97, R1-1906802, Reno, Nevada, May 13, 2019-May 17, 2019, 5 Pages, May 17, 2019, the whole document.

(Continued)

*Primary Examiner* — Vineeta S Panwalkar
(74) *Attorney, Agent, or Firm* — QUALCOMM Incorporated

(57) ABSTRACT

Methods, systems, and devices for wireless communication are described. A first wireless device may transmit one or more signals to a second wireless device using an antenna panel including antenna elements that are arranged in a hexagonal configuration. The signals may be transmitted using one or more directional beams for multiple-input multiple-output communications with the second wireless device, the directional beams generated based on the antenna elements in the hexagonal configuration. The first wireless device may receive a signal from the second wireless device, and in some cases, the first wireless device may transmit one or more reference signals via the one or more directional (Continued)

beams, the reference signals associated with a set of two or more antenna elements of the antenna panel of the first wireless device. The second wireless device may perform measurements of the reference signals and transmit a measurement report to the first wireless device.

30 Claims, 16 Drawing Sheets

(56)                References Cited

U.S. PATENT DOCUMENTS

| | | | |
|---|---|---|---|
| 2014/0324527 A1* | 10/2014 | Kulkarni | G06Q 30/0261 |
| | | | 705/7.29 |
| 2019/0198998 A1* | 6/2019 | Chiu | H01Q 15/24 |
| 2020/0382208 A1 | 12/2020 | Hormis et al. | |
| 2021/0058899 A1* | 2/2021 | Lee | H04W 52/146 |

OTHER PUBLICATIONS

International Search Report and Written Opinion—PCT/CN2021/142935 —ISA/EPO—Sep. 28, 2022 (2106381WO1).
Supplementary European Search Report—EP21969539—Search Authority—Munich—Jul. 8, 2025 (2106381EP).

* cited by examiner

710

720

715

705

700

Figure 12:
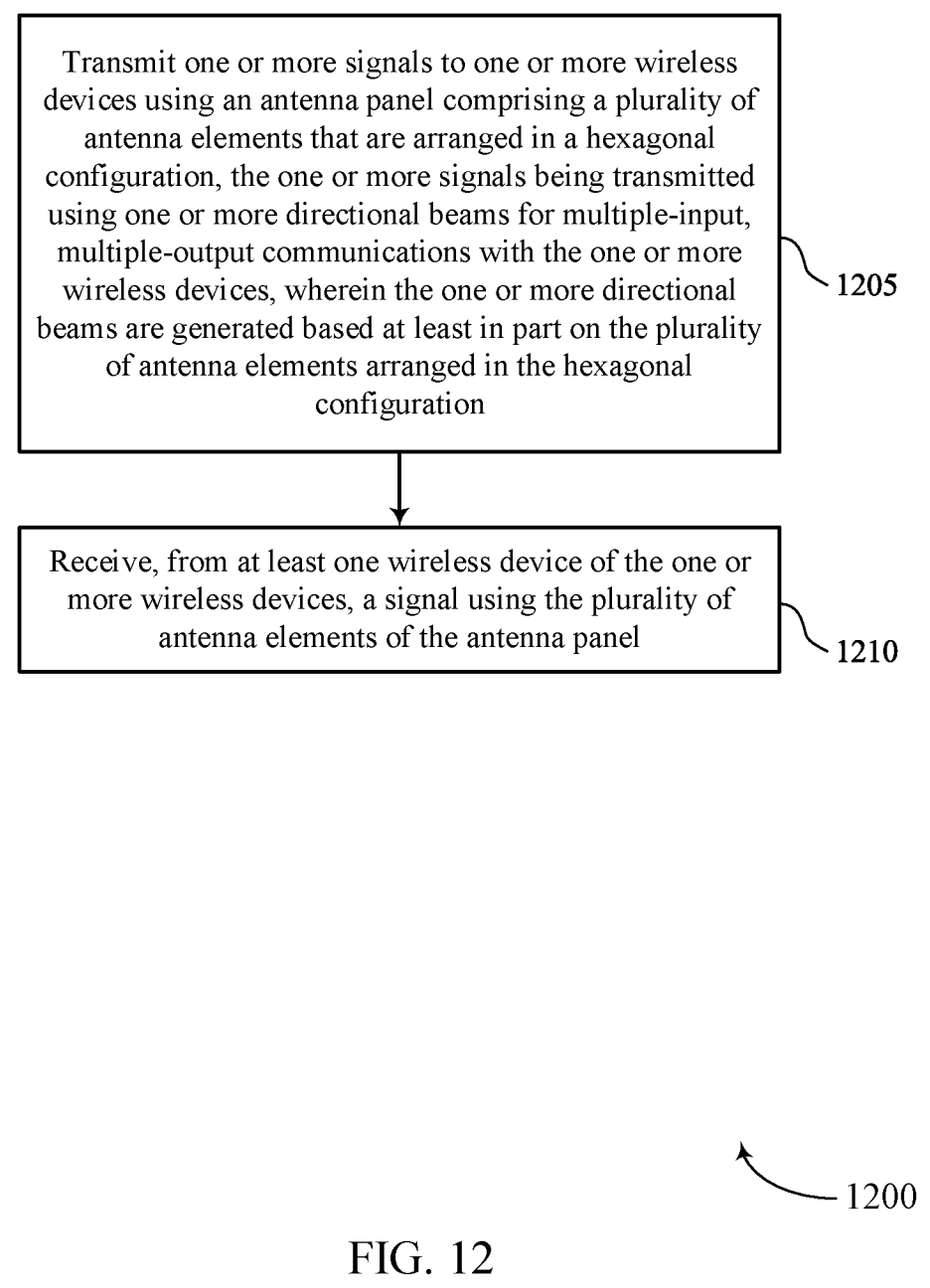

Transmit one or more signals to one or more wireless devices using an antenna panel comprising a plurality of antenna elements that are arranged in a hexagonal configuration, the one or more signals being transmitted using one or more directional beams for multiple-input, multiple-output communications with the one or more wireless devices, wherein the one or more directional beams are generated based at least in part on the plurality of antenna elements arranged in the hexagonal configuration

1205

Receive, from at least one wireless device of the one or more wireless devices, a signal using the plurality of antenna elements of the antenna panel

Figure 13:
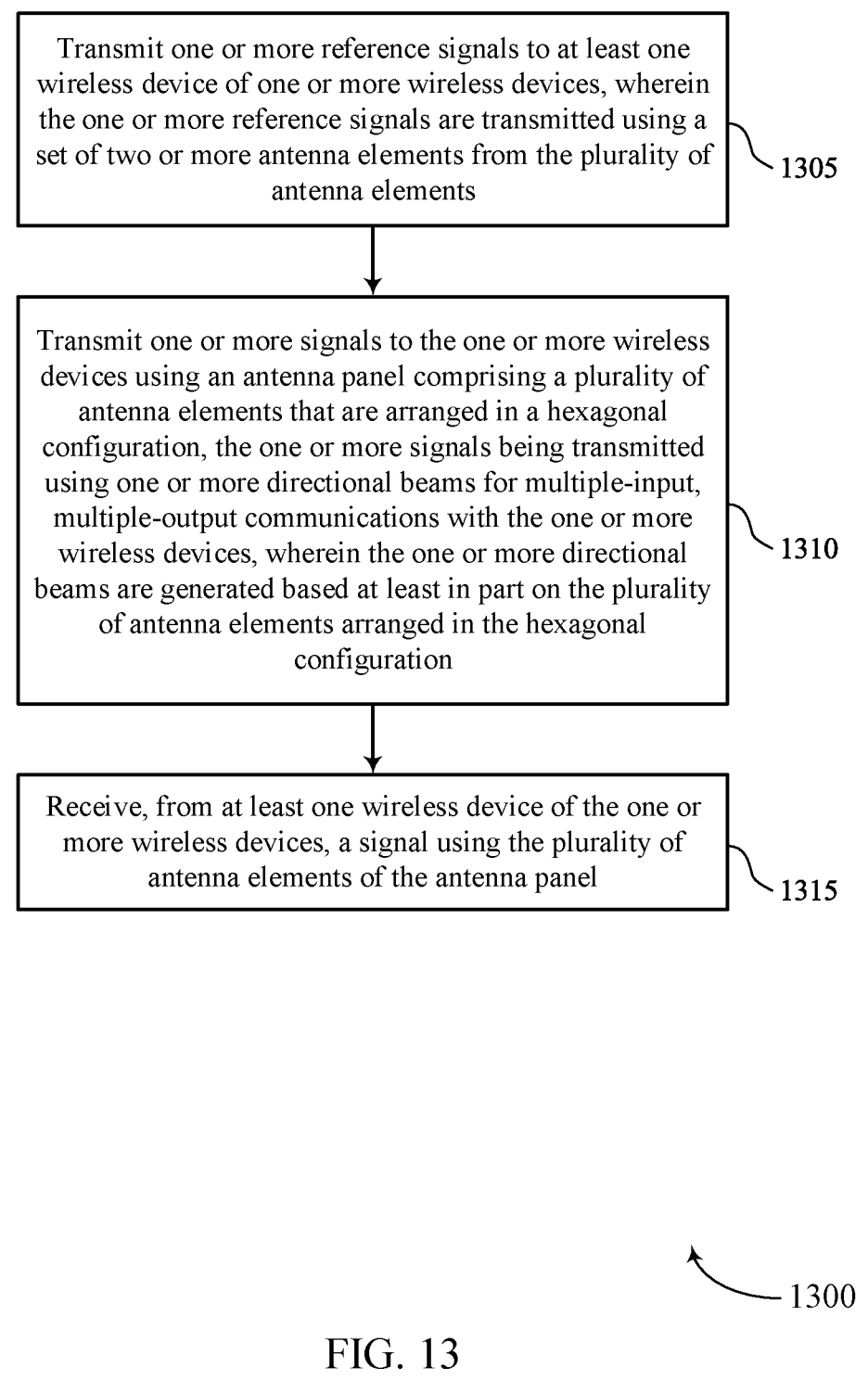

Transmit one or more reference signals to at least one wireless device of one or more wireless devices, wherein the one or more reference signals are transmitted using a set of two or more antenna elements from the plurality of antenna elements ⎦ 1305

↓

Transmit one or more signals to the one or more wireless devices using an antenna panel comprising a plurality of antenna elements that are arranged in a hexagonal configuration, the one or more signals being transmitted using one or more directional beams for multiple-input, multiple-output communications with the one or more wireless devices, wherein the one or more directional beams are generated based at least in part on the plurality of antenna elements arranged in the hexagonal configuration ⎦ 1310

↓

Receive, from at least one wireless device of the one or more wireless devices, a signal using the plurality of antenna elements of the antenna panel ⎦ 1315

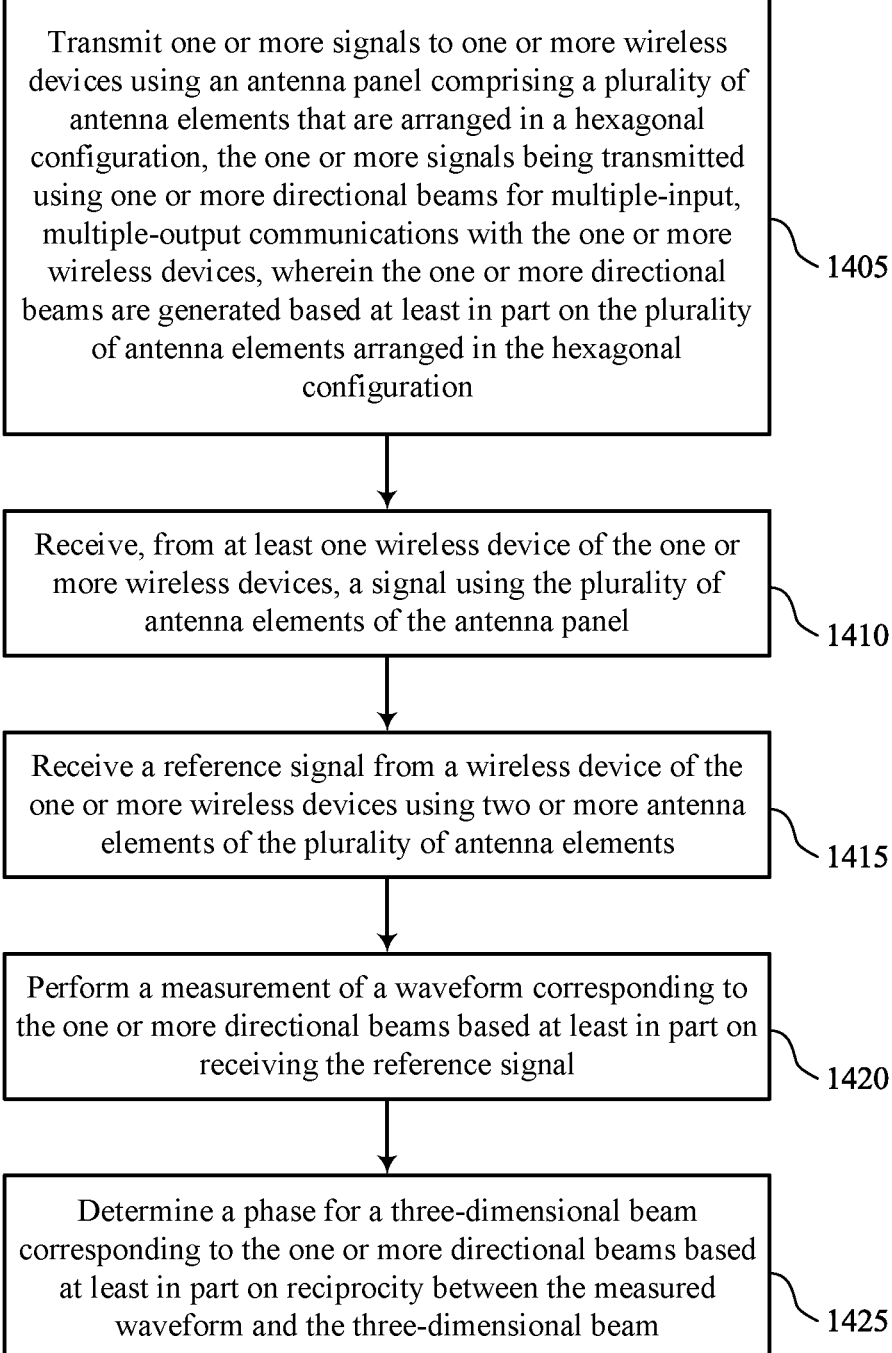

Transmit one or more signals to one or more wireless devices using an antenna panel comprising a plurality of antenna elements that are arranged in a hexagonal configuration, the one or more signals being transmitted using one or more directional beams for multiple-input, multiple-output communications with the one or more wireless devices, wherein the one or more directional beams are generated based at least in part on the plurality of antenna elements arranged in the hexagonal configuration

1405

Receive, from at least one wireless device of the one or more wireless devices, a signal using the plurality of antenna elements of the antenna panel

1410

Receive a reference signal from a wireless device of the one or more wireless devices using two or more antenna elements of the plurality of antenna elements

1415

Perform a measurement of a waveform corresponding to the one or more directional beams based at least in part on receiving the reference signal

1420

Determine a phase for a three-dimensional beam corresponding to the one or more directional beams based at least in part on reciprocity between the measured waveform and the three-dimensional beam

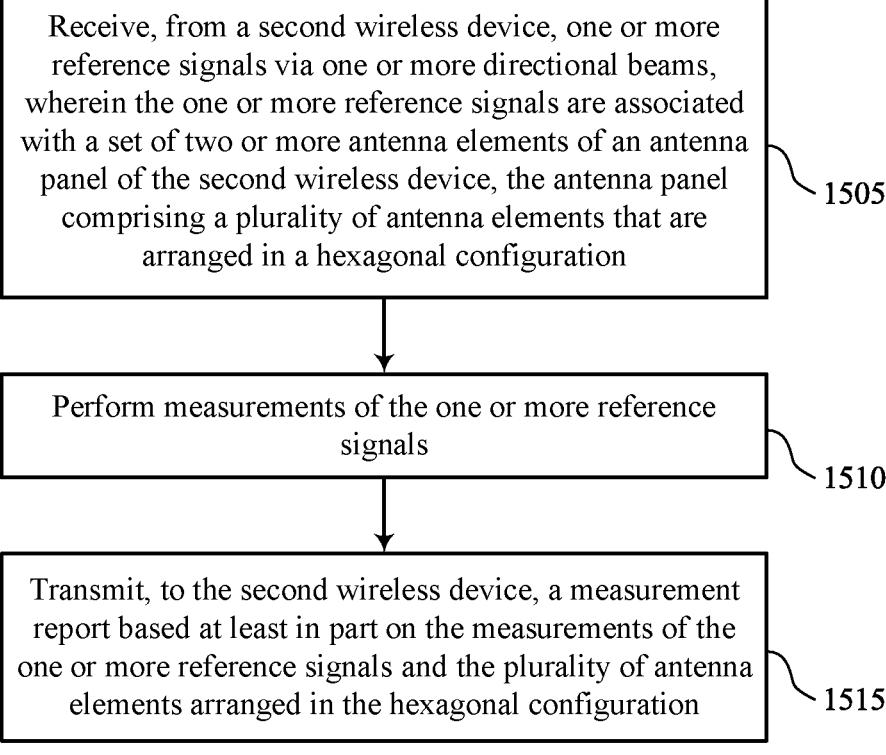

Receive, from a second wireless device, one or more reference signals via one or more directional beams, wherein the one or more reference signals are associated with a set of two or more antenna elements of an antenna panel of the second wireless device, the antenna panel comprising a plurality of antenna elements that are arranged in a hexagonal configuration

1505

Perform measurements of the one or more reference signals

1510

Transmit, to the second wireless device, a measurement report based at least in part on the measurements of the one or more reference signals and the plurality of antenna elements arranged in the hexagonal configuration

Figure 16:
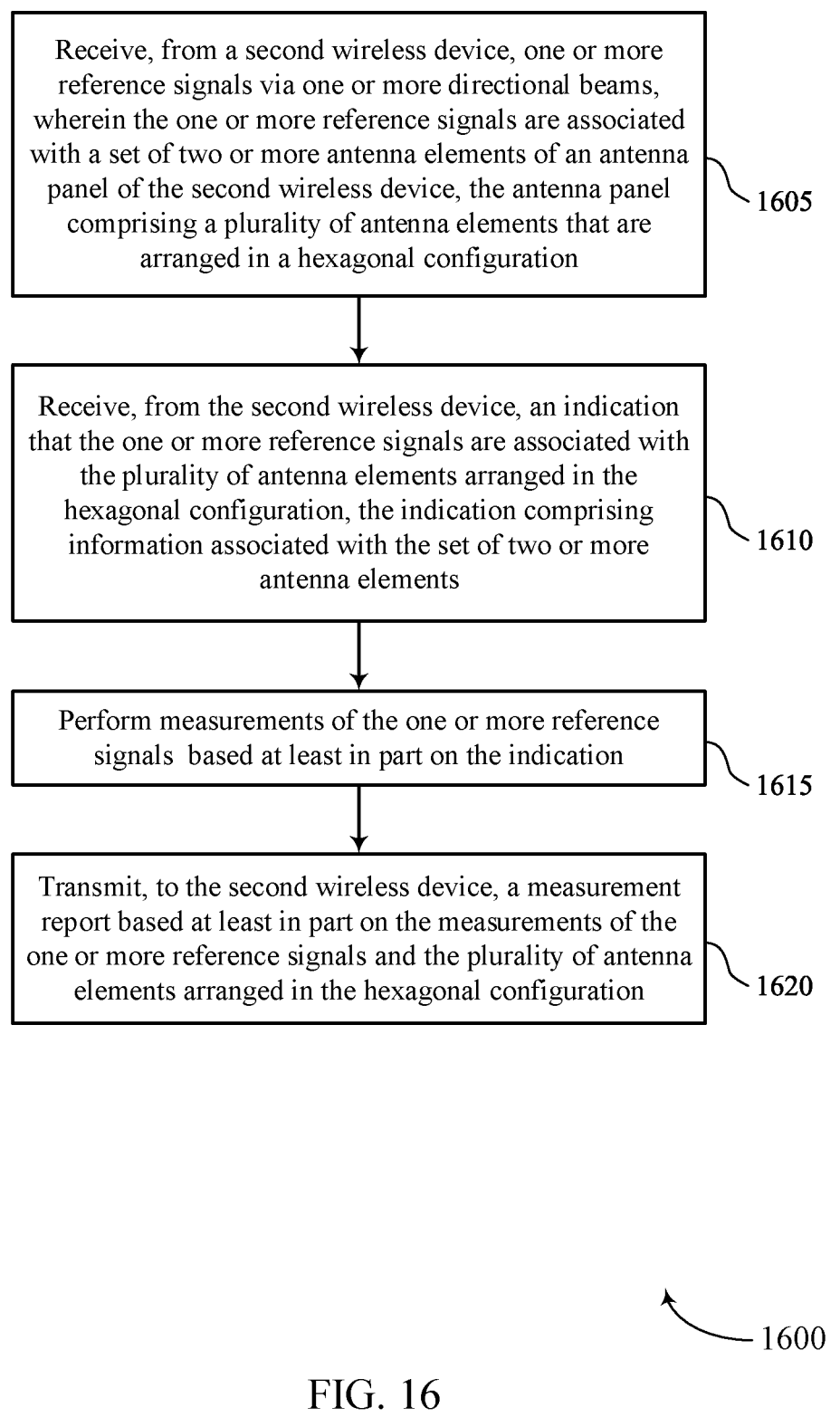

Receive, from a second wireless device, one or more reference signals via one or more directional beams, wherein the one or more reference signals are associated with a set of two or more antenna elements of an antenna panel of the second wireless device, the antenna panel comprising a plurality of antenna elements that are arranged in a hexagonal configuration

1605

Receive, from the second wireless device, an indication that the one or more reference signals are associated with the plurality of antenna elements arranged in the hexagonal configuration, the indication comprising information associated with the set of two or more antenna elements

1610

Perform measurements of the one or more reference signals based at least in part on the indication

1615

Transmit, to the second wireless device, a measurement report based at least in part on the measurements of the one or more reference signals and the plurality of antenna elements arranged in the hexagonal configuration

HEXAGONAL ANTENNA LATTICE FOR MULTIPLE-INPUT, MULTIPLE-OUTPUT COMMUNICATIONS WITH BEAMFORMING

CROSS REFERENCE

The present application is a 371 national stage filing of International PCT Application No. PCT/CN2021/142935 by ZHANG et al. entitled "HEXAGONAL ANTENNA LATTICE FOR MULTIPLE-INPUT, MULTIPLE-OUTPUT COMMUNICATIONS WITH BEAMFORMING," filed Dec. 30, 2021, which is assigned to the assignee hereof, and which is expressly incorporated by reference in its entirety herein.

FIELD OF TECHNOLOGY

The following relates to wireless communication, including hexagonal antenna lattice for multiple-input, multiple-output (MIMO) communications with beamforming.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, devices may be configured to communicate using beamforming techniques. However, conventional antenna configurations used for beamforming may have various deficiencies, particularly when a relatively large number of antenna elements are used for beamforming.

SUMMARY

The described techniques relate to improved methods, systems, devices, and apparatuses that support a hexagonal antenna lattice for multiple-input, multiple-output (MIMO) communications with beamforming. Generally, the described techniques provide for wireless devices (e.g., a user equipment (UE), a base station) to use a hexagonal antenna lattice in holographic MIMO communications with three-dimensional (3D) or angular beamforming, or both. Specifically, the described techniques provide a design for arranging transmit or receive antennas in a hexagonal lattice, which may achieve a relatively higher antenna density (e.g., as compared to rectangular antenna arrays). In addition, the hexagonal design may create relatively higher antenna gain while maintaining a minimum distance of a half of a wavelength between antenna elements in the hexagonal antenna array. In some examples, the antenna elements may be indexed in different ways, for example, according to various axes that may be defined for the hexagonal antenna array. Additionally or alternatively, for beamforming (e.g., 3D beamforming), the phase of each antenna may be calculated based on coordinates (e.g., cartesian and polar) of each antenna element. In some cases, reference signals may be transmitted from hexagonally-placed antennas with geometric information shared with a receiving device (e.g., the UE). In such cases, the receiving device may perform channel estimation calculations based on the hexagonal antenna elements.

In some cases, a first wireless device (e.g., a base station) may transmit one or more signals to a second wireless device (e.g., a UE) using an antenna panel including multiple antenna elements that are arranged in a hexagonal configuration. The signals may be transmitted using one or more directional beams for MIMO communications with the second wireless device (and other devices), where the one or more directional beams may be generated based on the antenna elements arranged in the hexagonal configuration. In some cases, the first wireless device may receive a signal from the second wireless device using the antenna elements of the antenna panel. In some examples, the first wireless device may transmit one or more reference signals via the one or more directional beams to the second wireless device, where the reference signals may be associated with a set of two or more antenna elements of an antenna panel of the first wireless device. The second wireless device may perform measurements (e.g., channel estimation) on the one or more reference signals, and the second wireless device may transmit a measurement report to the first wireless device based on the measurements.

A method for wireless communication at a first wireless device is described. The method may include transmitting one or more signals to one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration and receiving, from at least one wireless device of the one or more wireless devices, a signal using the set of multiple antenna elements of the antenna panel.

An apparatus for wireless communication at a first wireless device is described. The apparatus may include an antenna panel comprising a plurality of antenna elements arranged in a hexagonal configuration, a processor, memory coupled with the processor, and instructions stored in the memory. The instructions may be executable by the processor to cause the apparatus to transmit one or more signals to one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration and receive, from at least one wireless device of the one or more wireless devices, a signal using the set of multiple antenna elements of the antenna panel.

Another apparatus for wireless communication at a first wireless device is described. The apparatus may include means for transmitting one or more signals to one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration and means for receiving, from at least one wireless device of the one or more wireless devices, a signal using the set of multiple antenna elements of the antenna panel.

A non-transitory computer-readable medium storing code for wireless communication at a first wireless device is described. The code may include instructions executable by a processor to transmit one or more signals to one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration and receive, from at least one wireless device of the one or more wireless devices, a signal using the set of multiple antenna elements of the antenna panel.

Some examples of the method, apparatuses, and non-transitory computer-readable medium described herein may further include operations, features, means, or instructions for transmitting one or more reference signals to the at least one wireless device of the one or more wireless devices, where the one or more reference signals may be transmitted using a set of two or more antenna elements from the set of multiple antenna elements.

In some examples of the method, apparatuses, and non-transitory computer-readable medium described herein, the set of two or more antenna elements includes one or more antenna elements associated with a first axis of the hexagonal configuration and one or more antenna elements associated with a second axis of the hexagonal configuration, the first axis being non-orthogonal to the second axis.

Some examples of the method, apparatuses, and non-transitory computer-readable medium described herein may further include operations, features, means, or instructions for transmitting, to the at least one wireless device, an indication that the one or more reference signals may be associated with the set of multiple antenna elements arranged in the hexagonal configuration, where the indication includes information associated with the set of two or more antenna elements.

In some examples of the method, apparatuses, and non-transitory computer-readable medium described herein, the information associated with the set of two or more antenna elements includes separation information for the set of multiple antenna elements, an index for each antenna element of the set of two or more antenna elements, or any combination thereof.

In some examples of the method, apparatuses, and non-transitory computer-readable medium described herein, the set of two or more antenna elements include one or more antenna elements associated with a third axis of the hexagonal configuration and one or more antenna elements associated with a fourth axis of the hexagonal configuration, the third axis being orthogonal to the fourth axis, and where the one or more antenna elements associated with the third axis may be offset with respect to the one or more antenna elements associated with the fourth axis.

Some examples of the method, apparatuses, and non-transitory computer-readable medium described herein may further include operations, features, means, or instructions for receiving a reference signal from a wireless device of the one or more wireless devices using two or more antenna elements of the set of multiple antenna elements, performing a measurement of a waveform corresponding to the one or more directional beams based on receiving the reference signal, and determining a phase for a 3D beam corresponding to the one or more directional beams based on reciprocity between the measured waveform and the 3D beam.

Some examples of the method, apparatuses, and non-transitory computer-readable medium described herein may further include operations, features, means, or instructions for determining an index corresponding to each antenna element of the set of multiple antenna elements, the index including a row index and a column index, where the one or more signals may be transmitted based on the index corresponding to each antenna element of the set of multiple antenna elements.

In some examples of the method, apparatuses, and non-transitory computer-readable medium described herein, the row index coincides with an x-axis and the column index may be projected onto the x-axis, a y-axis, or both, in a 3D coordinate system.

In some examples of the method, apparatuses, and non-transitory computer-readable medium described herein, a phase portion of a first signal transmitted using the antenna panel may include operations, features, means, or instructions for $$\exp\left[\frac{i2\pi}{\lambda}\left[r + c\cos\left(\frac{\pi}{3}\right)\right]\sin\theta_{0,x} + c\sin\left(\frac{\pi}{3}\right)\sin\theta_{0,y}\right],$$

includes the column index, $\theta_{0,x}$ includes a first beamforming angle of departure, and $\theta_{0,y}$ includes a second beamforming angle of departure.

In some examples of the method, apparatuses, and non-transitory computer-readable medium described herein, a phase portion of a first signal transmitted using the antenna panel may include operations, features, means, or instructions for $$\exp\left[-\frac{i2\pi r}{\lambda}\right],$$

where $r = \sqrt{z'^2 + (x-x_0)^2 + (y-y_0)^2}$, $$x = r + c\cos\left(\frac{\pi}{3}\right), \text{ and } y = c\sin\left(\frac{\pi}{3}\right),$$

and where r includes the row index, c includes the column index, and z may be associated with a location of a wireless device of the one or more wireless devices.

In some examples of the method, apparatuses, and non-transitory computer-readable medium described herein, each antenna element of the set of multiple antenna elements that may be arranged in the hexagonal configuration may be separated from an adjacent antenna element by a distance including one half of a signal wavelength supported by the antenna panel.

In some examples of the method, apparatuses, and non-transitory computer-readable medium described herein, the one or more directional beams may be associated with 3D beamforming, angular beamforming, or any combination thereof.

A method for wireless communications at a first wireless device is described. The method may include receiving, from a second wireless device, one or more reference signals via one or more directional beams, where the one or more reference signals are associated with a set of two or more antenna elements of an antenna panel of the second wireless device, the antenna panel including a set of multiple antenna elements that are arranged in a hexagonal configuration, performing measurements of the one or more reference signals, and transmitting, to the second wireless device, a measurement report based on the measurements of the one or more reference signals and the set of multiple antenna elements arranged in the hexagonal configuration.

An apparatus for wireless communications at a first wireless device is described. The apparatus may include an antenna panel comprising a plurality of antenna elements arranged in a hexagonal configuration, a processor, memory coupled with the processor, and instructions stored in the memory. The instructions may be executable by the processor to cause the apparatus to receive, from a second wireless device, one or more reference signals via one or more directional beams, where the one or more reference signals are associated with a set of two or more antenna elements of an antenna panel of the second wireless device, the antenna panel including a set of multiple antenna elements that are arranged in a hexagonal configuration, perform measurements of the one or more reference signals, and transmit, to the second wireless device, a measurement report based on the measurements of the one or more reference signals and the set of multiple antenna elements arranged in the hexagonal configuration.

Another apparatus for wireless communications at a first wireless device is described. The apparatus may include means for receiving, from a second wireless device, one or more reference signals via one or more directional beams, where the one or more reference signals are associated with a set of two or more antenna elements of an antenna panel of the second wireless device, the antenna panel including a set of multiple antenna elements that are arranged in a hexagonal configuration, means for performing measurements of the one or more reference signals, and means for transmitting, to the second wireless device, a measurement report based on the measurements of the one or more reference signals and the set of multiple antenna elements arranged in the hexagonal configuration.

A non-transitory computer-readable medium storing code for wireless communications at a first wireless device is described. The code may include instructions executable by a processor to receive, from a second wireless device, one or more reference signals via one or more directional beams, where the one or more reference signals are associated with a set of two or more antenna elements of an antenna panel of the second wireless device, the antenna panel including a set of multiple antenna elements that are arranged in a hexagonal configuration, perform measurements of the one or more reference signals, and transmit, to the second wireless device, a measurement report based on the measurements of the one or more reference signals and the set of multiple antenna elements arranged in the hexagonal configuration.

In some examples of the method, apparatuses, and non-transitory computer-readable medium described herein, the one or more reference signals associated with the set of two or more antenna elements include reference signals associated with one or more antenna elements associated with a first axis of the hexagonal configuration and one or more antenna elements associated with a second axis of the hexagonal configuration, the first axis being non-orthogonal to the second axis.

Some examples of the method, apparatuses, and non-transitory computer-readable medium described herein may further include operations, features, means, or instructions for receiving, from the second wireless device, an indication that the one or more reference signals may be associated with the set of multiple antenna elements arranged in the hexagonal configuration, the indication including information associated with the set of two or more antenna elements, where the measurements may be performed based on the indication.

In some examples of the method, apparatuses, and non-transitory computer-readable medium described herein, the information associated with the set of two or more antenna elements includes separation information for the set of multiple antenna elements, an index for each antenna element of the set of two or more antenna elements, or any combination thereof.

In some examples of the method, apparatuses, and non-transitory computer-readable medium described herein, the one or more reference signals associated with the set of two or more antenna elements include reference signals associated with one or more antenna elements associated with a third axis of the hexagonal configuration and one or more antenna elements associated with a fourth axis of the hexagonal configuration, the third axis being orthogonal to the fourth axis, and where the one or more antenna elements associated with the third axis may be offset with respect to the one or more antenna elements associated with the fourth axis.

BRIEF DESCRIPTION OF THE DRAWINGS

FIGS. 12 through 16 show flowcharts illustrating methods that support a hexagonal antenna lattice for MIMO communications with beamforming in accordance with aspects of the present disclosure.

DETAILED DESCRIPTION

Figure 1:
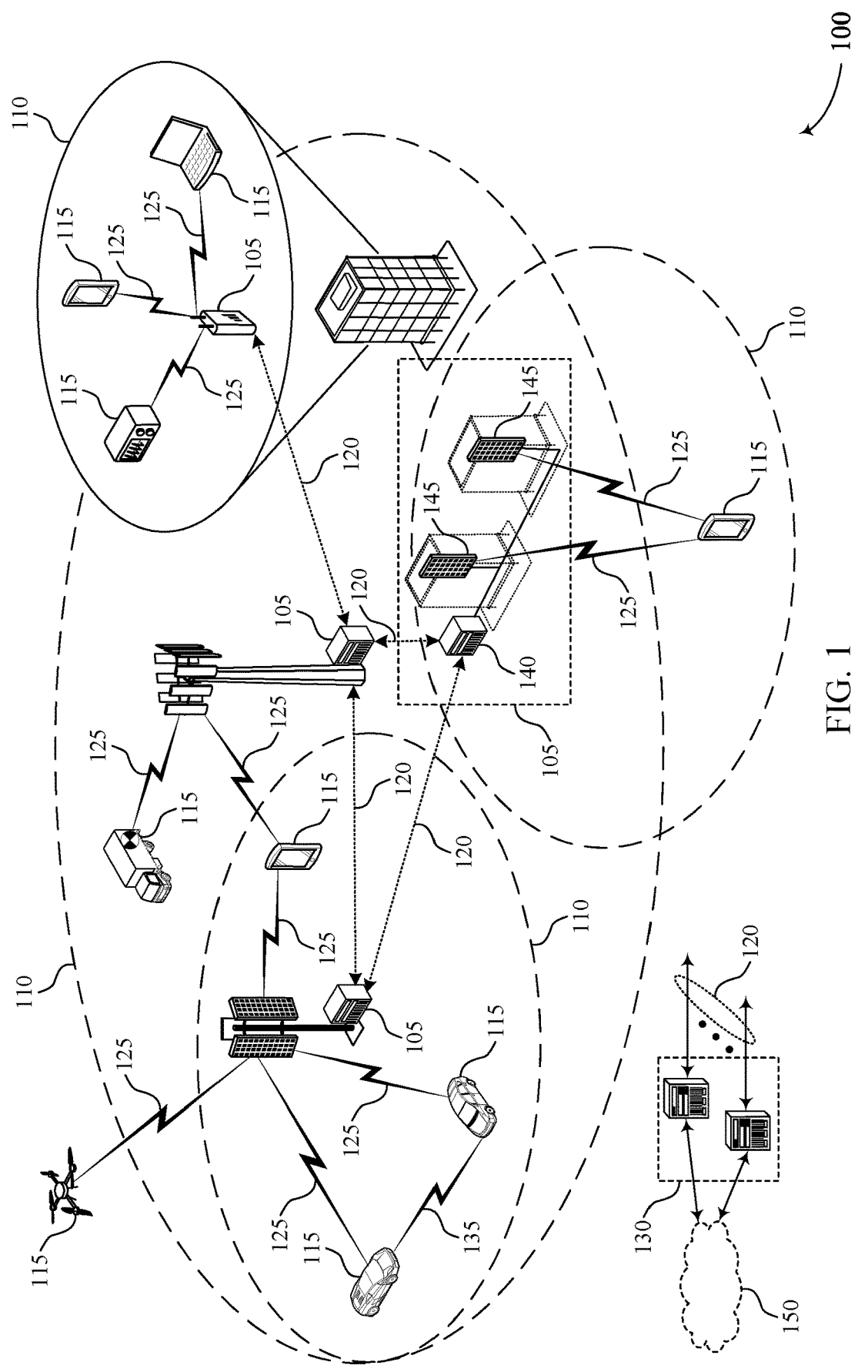
FIG. 1 illustrates an example of a wireless communications system that supports a hexagonal antenna lattice for multiple-input, multiple-output (MIMO) communications with beamforming in accordance with aspects of the present disclosure.

In some wireless communications systems (e.g., fifth generation (5G), New Radio (NR) systems), devices may be configured to communicate using beamforming techniques. For example, a base station may focus a transmission beam in the direction of a user equipment (UE) using two-dimensional (2D) beamforming techniques. In some cases, the UE and the base station may perform multi-user (MU) multiple-input multiple-output (MIMO) communications to transmit or receive multiple signals via different spatial layers. The multiple signals may be transmitted or received via different antennas or different combinations of antennas. For example, the base station may maintain communications with a first UE via a first beam and communications via with a second UE via a second beam that is different than the first beam.

Some wireless communications systems may be configured to use beamforming techniques which may support both direction and distance discrimination in MU-MIMO scenarios. For example, the base station may be configured to perform three-dimensional (3D) beamforming techniques, where the base station may form transmission beams using different antenna panels to UEs that may distinguish both direction and distance between the UEs and the base station. In some cases, the base station may be configured to perform 3D holographic MIMO in which the base station may multiplex UEs otherwise unsupported for multiplexing (e.g., if the base station were to use 2D beamforming techniques).

A UE and a base station may use beamformed signals for transmission and reception of wireless communications. In some MU-MIMO scenarios, the base station may use 3D (e.g., holographic) MIMO (e.g., as compared to 2D beamforming) to transmit one or more data signals to one or more UEs. In such cases, a UE and a base station may use relatively large antenna panels with densely packed antenna elements for holographic MIMO communications, which may inadvertently cause coupling between the antenna elements. Moreover, a rectangular antenna array may lack optimal antenna placement given a minimum, half-wavelength separation constraint between respective antenna elements, and other configurations may be more efficient, particularly for MIMO communications.

Techniques described herein enable wireless devices (e.g., a UE, a base station) to use a hexagonal antenna lattice in holographic MIMO with beamforming (e.g., angular beamforming, 3D beamforming). Specifically, the described techniques provide a design for arranging transmit or receive antennas in a hexagonal lattice, which may achieve a relatively higher antenna density (e.g., as compared to rectangular antenna arrays). In addition, the hexagonal design may achieve relatively higher antenna gain while maintaining a minimum distance of a half of a wavelength between antenna elements in the hexagonal antenna array. In some examples, the antenna elements in the hexagonal lattice may be indexed in different ways, for example, according to various axes that may be defined for the hexagonal antenna array. Additionally or alternatively, for 3D beamforming, the phase of each antenna may be calculated based on coordinates (e.g., cartesian and polar) of each antenna element. In some cases, reference signals may be transmitted from hexagonally-placed antennas with geometric information shared with a receiving device (e.g., the UE). In such cases, the receiving device may perform channel estimation calculations based on the hexagonal antenna elements.

In some cases, a first wireless device (e.g., a base station) may transmit one or more signals to a second wireless device (e.g., a UE) using an antenna panel including multiple antenna elements that are arranged in a hexagonal configuration. The signals may be transmitted using one or more directional beams for MIMO communications with the second wireless device, where the one or more directional beams may be generated based on the antenna elements arranged in the hexagonal configuration. In some cases, the first wireless device may receive a signal from the second wireless device using the antenna elements of the antenna panel. In some examples, the first wireless device may transmit one or more reference signals via the one or more directional beams to the second wireless device, where the reference signals may be associated with a set of two or more antenna elements of an antenna panel of the first wireless device. The second wireless device may perform measurements (e.g., channel estimation) on the one or more reference signals, and the second wireless device may transmit a measurement report to the first wireless device based on the measurements.

Aspects of the disclosure are initially described in the context of wireless communications systems. Aspects of the disclosure are then described in the context of rectangular antenna arrays, hexagonal antenna arrays, and process flows. Aspects of the disclosure are further illustrated by and described with reference to apparatus diagrams, system diagrams, and flowcharts that relate to hexagonal antenna lattice for MIMO communications with beamforming.

FIG. 1 illustrates an example of a wireless communications system 100 that supports a hexagonal antenna lattice for MIMO communications with beamforming in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and MU-MIMO, where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some wireless communications systems 100, wireless devices (e.g., UEs 115, base stations 105) may utilize massive MIMO and holographic MIMO (e.g., in 5G communications). Holographic MIMO may utilize a large array of controlled transmitters and receivers, which may operate as a combination of a signal source and an optical lens (e.g., or an ultimate electronic lens with adjustable amplitude and phase). In some examples, holographic MIMO may be used in other wireless communications systems 100 (e.g., sixth generation (6G) wireless communications systems), such as for systems with high frequency bands.

In some cases, massive MIMO communications may introduce coupling between antennas that may be densely packed into a transmit or receive panel. To reduce coupling, antenna panels (e.g., rectangular antenna arrays) may be designed with a half-wavelength separation between antennas. However, a rectangular antenna array with antennas placed in a square lattice may lack optimal antenna placement given a minimum, half-wavelength separation constraint between antennas, and other configurations may be more efficient, particularly for MIMO communications.

The wireless communications system 100 may support one or more wireless devices (e.g., a UE 115, a base station 105) that each include a hexagonal antenna lattice for holographic MIMO with beamforming (e.g., 3D beamforming, angular beamforming). Specifically, the wireless communications system 100 may include devices that are configured with transmit and/or receive antennas arranged in a hexagonal lattice, which may achieve a relatively higher antenna density (e.g., as compared to rectangular antenna arrays). In addition, the hexagonal design may allow for a relatively increased antenna gain while maintaining a threshold (e.g., a minimum) distance of a half of a wavelength between antenna elements in the hexagonal antenna array. In some examples, the antenna elements may be indexed in different ways, for example, according to various axes that may be defined for the hexagonal antenna array. Additionally or alternatively, for 3D beamforming, the phase of each antenna may be calculated based on coordinates (e.g., cartesian and polar) of each antenna element. In some cases, reference signals may be transmitted from hexagonally-placed antennas with geometric information shared with a receiving device (e.g., the UE). In such cases, the receiving device may perform channel estimation calculations based on the hexagonal antenna elements.

Figure 2:
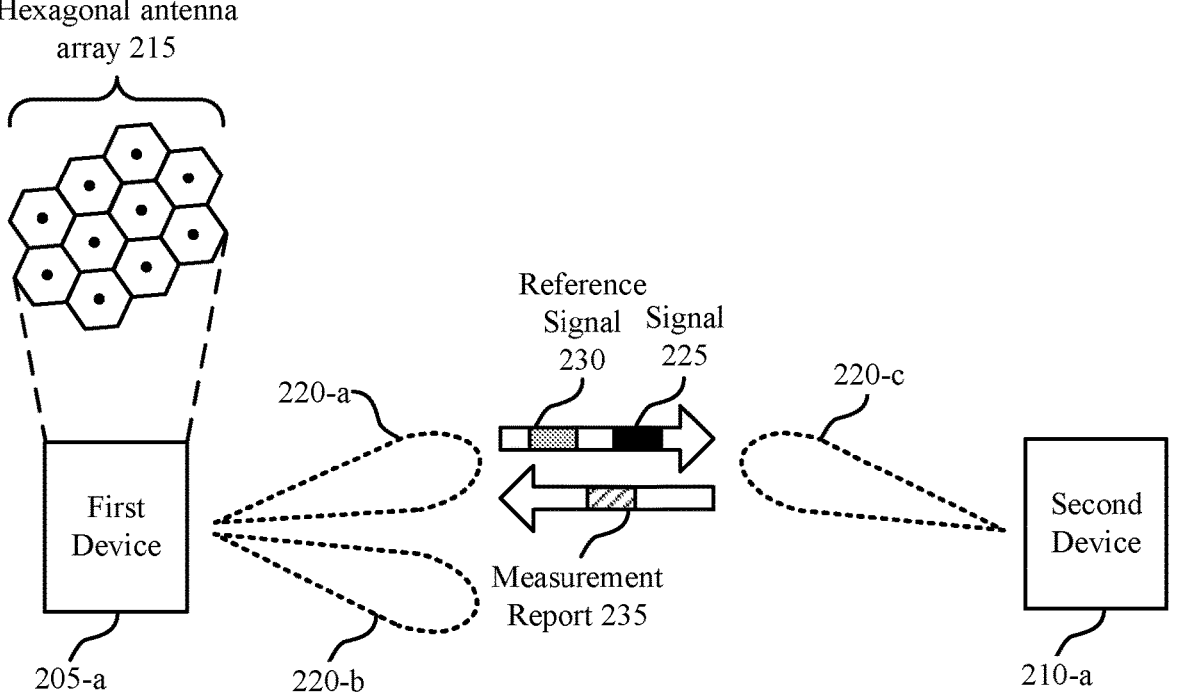
FIG. 2 illustrates an example of a wireless communications system that supports a hexagonal antenna lattice for MIMO communications with beamforming in accordance with aspects of the present disclosure.

FIG. 2 illustrates an example of a wireless communications system 200 that supports a hexagonal antenna lattice for MIMO communications with beamforming in accordance with aspects of the present disclosure. In some examples, the wireless communications system 200 may implement aspects of the wireless communications system 100 or may be implemented by aspects of the wireless communications system 100. The wireless communications system 200 may include a first device 205-a and a second device 210-a. The first device 205-a may include a hexagonal antenna array 215 that has a set of multiple antenna elements arranged or configured in accordance with a hexagonal geometry.

The first device 205-a (e.g., a base station) may be configured to communicate with the second device 210-a (e.g., a UE) using the hexagonal antenna array 215. In some examples, the first device 205-a may communicate with one or multiple second devices 210. The first device 205-a may be configured to perform 3D holographic MIMO using the hexagonal antenna array 215, during which the first device 205-a may focus a directional beam at the second device 210-a. The hexagonal antenna array 215 may include transmit or receive antenna elements that may be arranged in a hexagonal lattice to achieve a relatively higher antenna density (e.g., as compared to a rectangular antenna array). In some cases, the hexagonal design may provide for a relatively higher antenna gain while maintaining a minimum distance of a half of a wavelength between antenna elements in the hexagonal antenna array 215.

In some examples, the antenna elements in the hexagonal antenna array 215 may be indexed in different ways, for example, according to various axes that may be defined for the hexagonal antenna array 215. For example, beamforming toward a particular angle along an x-axis and a y-axis may be realized with a transformation of coordinates. In some examples, for 3D beamforming, the phase of each antenna may be calculated based on coordinates (e.g., cartesian and polar) of each antenna element. In addition, reference signals may be transmitted from hexagonally-placed antennas in the hexagonal antenna array 215 with geometric information shared with the second device 210-a (e.g., the UE). In such cases, the second device 210-a may perform a channel estimation based on the hexagonal antenna elements in the hexagonal antenna array 215.

In some examples, the hexagonal antenna array 215 may include a relatively larger density of transmit or receive antennas as compared to a rectangular antenna array. For example, assuming the hexagonal antenna array 215 is infinitely large, an area occupied by an antenna in the hexagonal antenna array 215 may be compared to an area occupied by an antenna in the rectangular antenna array. In the rectangular antenna array, each antenna may occupy an area of (0.5λ) (0.5λ)=0.25λ², and in the hexagonal antenna array 215, each antenna may occupy an area of $$6\left(0.5(0.25\lambda)\left(0.25\lambda * \frac{2}{\sqrt{3}}\right)\right) = \frac{\sqrt{3}}{2}0.25\lambda^2.$$

As such, the hexagonal placement of antennas in the hexagonal antenna array 215 may result in a reduction in area of 14%, which is equivalent to an increase in antenna element density by 14%.

Additionally or alternatively, hexagonal packing (e.g., hexagonal placement) of antennas may be optimal for large antenna arrays. For example, if antenna packing with a threshold (e.g., minimum) distance constraint (e.g., half of a wavelength) is equated with circle packing, then the highest-density packing of circles may be a hexagonal packing arrangement in which the centers of the circles are arranged in a hexagonal lattice (e.g., if the total area of the lattice is infinite). In addition, the uniformity of the antenna lattice and the uniformity of an inter-antenna distance may impact the smoothness of directional beams (e.g., 3D beams in holographic MIMO). That is, hexagonal placement of antennas may create a uniform antenna lattice while maintaining a uniform inter-antenna distance, which may be optimal for antenna arrays used in holographic MIMO.

The wireless communications system 200 may support techniques for beamforming in MIMO communications (e.g., holographic MIMO) using a hexagonal antenna lattice. For example, the first device 205-*a* may use the hexagonal antenna array 215 to communicate with the second device 210-*a* via a directional beam 220-*a*, a directional beam 220-*b*, and a directional beam 220-*c*, which may be associated with 3D beamforming, angular beamforming, or any combination thereof. In some examples, the first device 205-*a* may use directional beam 220-*a* to transmit one or more signals 225 to one or more second devices 210, including the second device 210-*a*, using the hexagonal antenna array 215. The directional beams 220 may be generated based on the multiple antenna elements that are arranged in a hexagonal configuration in the hexagonal antenna array 215. In some examples, the first device 205-*a* may receive a signal using the hexagonal antenna array 215 from the second device 210-*a*.

In some cases, the first device 205-*a* may transmit a reference signal 230 to the second device 210-*a* via the directional beam 220-*a*. In some examples, the first device 205-*a* may transmit one or more reference signals 230 via any number of directional beams 220. The reference signal 230 may be associated with a set of two or more antenna elements in the hexagonal antenna array 215, where a first antenna element of the set may be associated with a first axis (e.g., a row) and a second antenna element of the set may be associated with a second axis (e.g., a column), where the first axis may be non-orthogonal to the second axis. Additionally or alternatively, the first device 205-*a* may transmit an indication that the reference signal 230 is associated with the antenna elements arranged in the hexagonal antenna array 215, and the indication may include information (e.g., geometric information) associated with the set of two or more antenna elements, including separation information for the antenna elements, an index for each antenna element (e.g., corresponding to a row and a column), or any combination thereof. In some cases, the second device 210-*a* may perform a measurement of the reference signal 230, and the second device 210-*a* may transmit a measurement report 235 to the first device 205-*a* based on the measurement of the reference signal 230.

Figure 3:
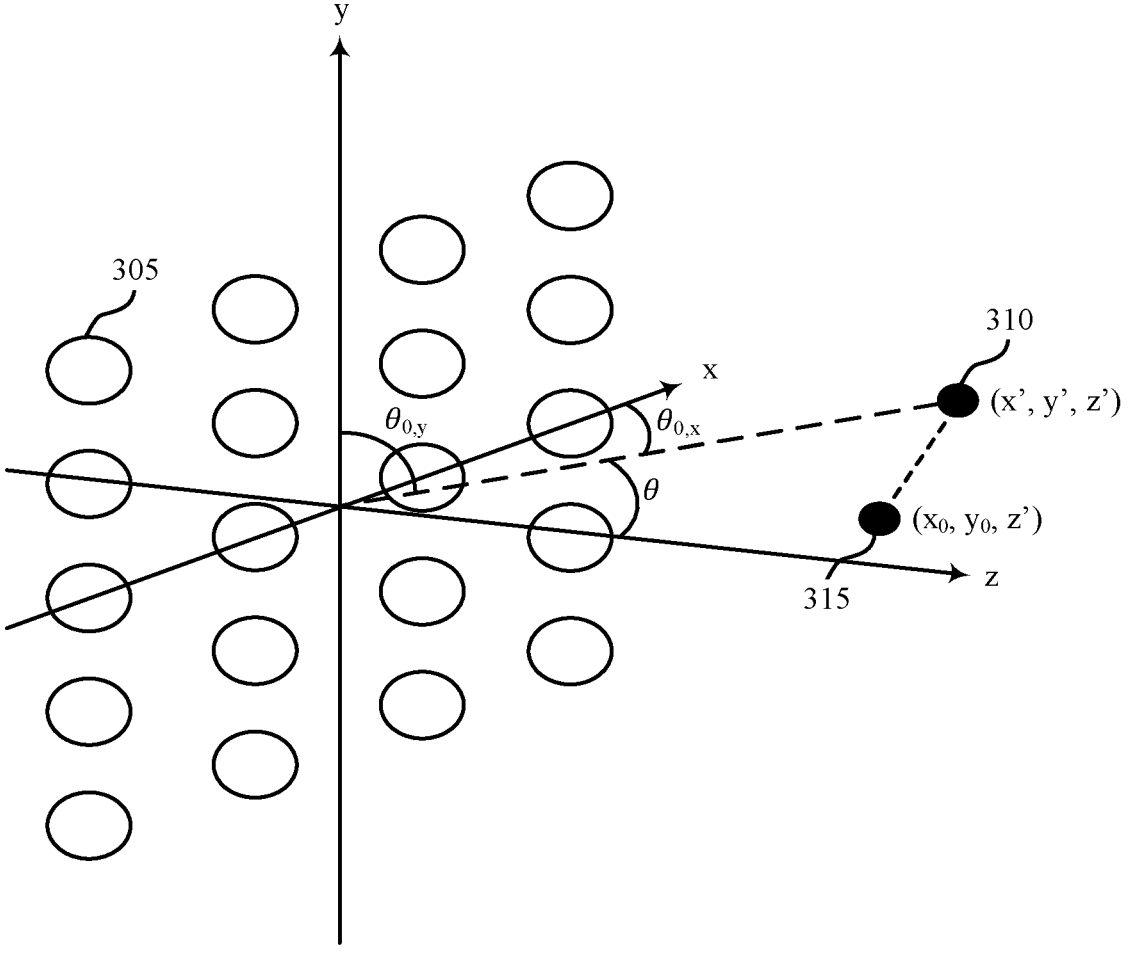
FIG. 3 illustrates an example of a rectangular antenna array that supports a hexagonal antenna lattice for MIMO communications with beamforming in accordance with aspects of the present disclosure.

FIG. 3 illustrates an example of a rectangular antenna array 300 that supports a hexagonal antenna lattice for MIMO communications with beamforming in accordance with aspects of the present disclosure. In some examples, the rectangular antenna array 300 may implement aspects of the wireless communications system 100 or may be implemented by aspects of the wireless communications system 100. In some examples, antenna elements 305 in the rectangular antenna array 300 may be indexed, for example, according to various axes (e.g., an (x, y, z) coordinate) that may be defined for the rectangular antenna array 300. For 3D beamforming, the phase of each antenna element 305 may be calculated based on coordinates (e.g., cartesian and polar) of each antenna element 305.

In some examples, a transmit panel may be located at z=0 (e.g., on the z-axis), and an arbitrary receiver 310 may be located at a coordinate (x', y', z'). A first device (e.g., a transmitter) and a second device (e.g., a receiver, the arbitrary receiver 310) may use 3D beamforming for MIMO communications (e.g., holographic MIMO). For example, in 5G massive MIMO communications and in some examples of holographic MIMO communications, a directional beam used for communications between the first device and the second device may maintain that $$\frac{x^2}{\lambda z} \ll 1 \text{ and } \frac{y^2}{\lambda z} \ll 1.$$

As such, a phase term corresponding to the transmit panel may be expressed as $$\exp\left[\frac{i2\pi}{\lambda}(x\sin\theta_{0,x} + y\sin\theta_{0,y})\right],$$

where $\theta_{0,x}$ and $\theta_{0,y}$ may be the intended beamforming angle of departure in the x-direction and the y-direction, respectively, in the rectangular antenna array 300.

Additionally or alternatively, 3D beamforming may target a spherical waveform converging to a single point 315 at a coordinate $(x_0, y_0, z')$. As such, the transmitter array may have a phase profile of $$\exp\left[-\frac{i2\pi r}{\lambda}\right],$$

where $r = \sqrt{z'^2 + (x-x_0)^2 + (y-y_0)^2}$ by applying reverse propagation, where reverse propagation may include estimating a channel based on the received spherical waveform and recovering the phase term for the converging spherical waveform based on the channel estimate.

As described herein, however, a hexagonal array (e.g., an antenna array including multiple antenna elements arranged in a hexagonal geometry, such as the hexagonal antenna array 215 described with reference to FIG. 2) may include similar or different coordinate systems as compared to the rectangular antenna array 300. Specifically, each antenna element in a hexagonal lattice may be indexed using a row and column index. Additionally, or alternatively, each antenna element may use a cartesian-like coordinate system, where a set of antenna elements associated with one axis (e.g., an x axis) may have some offset value with respect to the other axis (e.g., the y axis). As a result, a coordinate transformation may be used, for example, when computing a phase term of a signal waveform. In either case, the hexagonal array may support a relatively higher number of antenna elements (e.g., compared to the rectangular antenna array 300) while also maintaining a threshold (e.g., minimum) separation between respective antenna elements.

Figure 4:
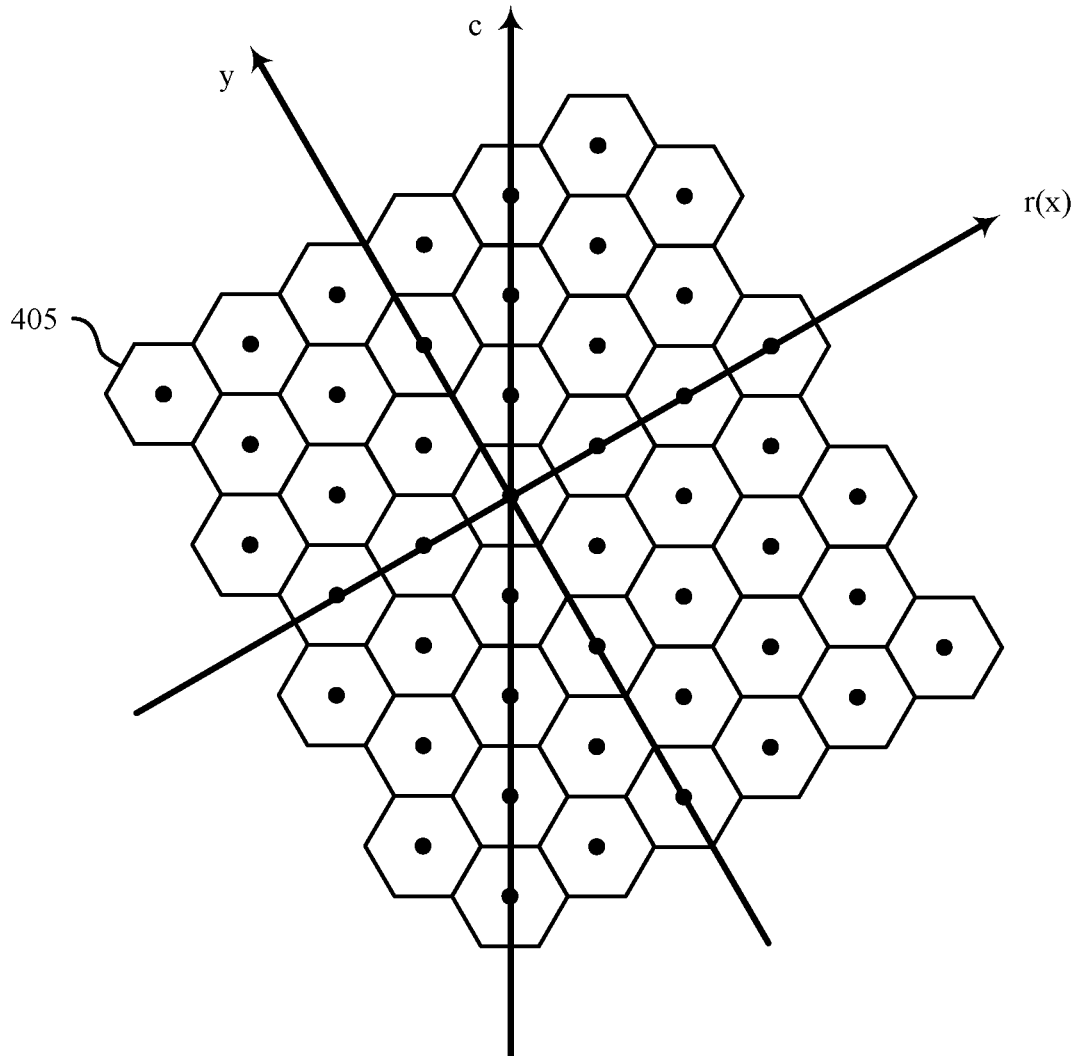
FIGS. 4 and 5 illustrate examples of hexagonal antenna arrays that support a hexagonal antenna lattice for MIMO communications with beamforming in accordance with aspects of the present disclosure.

FIG. 4 illustrates an example of a hexagonal antenna array 400 that supports a hexagonal antenna lattice for MIMO communications with beamforming in accordance with aspects of the present disclosure. In some examples, the hexagonal antenna array 400 may implement aspects of the wireless communications system 100 or may be implemented by aspects of the wireless communications system 100. The hexagonal antenna array 400 may include multiple antenna elements 405 arranged in a hexagonal lattice.

The hexagonal antenna array 400 may support techniques for beamforming for MIMO communications (e.g., angular beamforming, 3D beamforming in holographic MIMO). Specifically, the hexagonal antenna array 400 may support a design for arranging transmit or receive antennas (e.g., the antenna elements 405) in a hexagonal lattice, which may create a relatively higher antenna density and antenna gain (e.g., when compared to a rectangular antenna array) while maintaining a minimum distance of a half of a wavelength between the antenna elements 405 in the hexagonal antenna array 400.

In some examples, the antenna elements 405 may be indexed according to various axes (e.g., cartesian, polar) that may be defined for the hexagonal antenna array 400. For example, each antenna element 405 may be indexed by its corresponding row and column index (e.g., (r, c)), and signals may be transmitted based on the index corresponding to each antenna element 405. The row index (e.g., r) may coincide with the x-axis and the column index (e.g., c) may be projected onto the x-axis and the y-axis such that $$x = r + c\cos\left(\frac{\pi}{3}\right) \text{ and } y = c\sin\left(\frac{\pi}{3}\right).$$

In some examples, a phase term corresponding to the hexagonal antenna array 400 (e.g., the transmit panel wavefront phase term described herein with reference to FIG. 3) may expressed as $$\exp\left[\frac{i2\pi}{\lambda}(x\sin\theta_{0,x} + y\sin\theta_{0,y})\right],$$

where $\theta_{0,x}$ and $\theta_{0,y}$ may be intended beamforming angle of departure in the x-direction and the y-direction, respectively. The phase term may also be represented in (r, c) coordinates as $$\exp\left[\frac{i2\pi}{\lambda}\left[r + c\cos\left(\frac{\pi}{3}\right)\right]\sin\theta_{0,x} + c\sin\left(\frac{\pi}{3}\right)\sin\theta_{0,y}\right]$$

based on the relationship between the row and column indices and the x and y axes.

The hexagonal antenna array 400 may experience variations in beamforming at the boundaries of the array due to a mismatch between a rectangular border and the hexagonal lattice of the antenna elements 405. As such, the resulting beamforming pattern in the angular domain may be a convolution of intended angles of departure (e.g., $\theta_{0,x}$ and $\theta_{0,y}$) and an Angular-Spread-Function which may be an angular Fourier transform of an aperture function. For 3D beamforming, the resulting pattern on an imaging plane (e.g., a plane perpendicular at the target converging point) may be the convolution of an image (e.g., a single point) and a Point-Spread-Function, which may be a spatial or angular Fourier transform of the aperture function.

In some cases, reference signals may be transmitted from the antenna elements 405 with geometric information shared with a receiving device (e.g., a UE). For example, the reference signals may be transmitted from multiple antenna elements 405 such that the receiving device may perform channel estimation calculations based on the antenna elements 405. In some examples, with the hexagonal antenna array 400, the reference signals may be transmitted by antenna elements 405 either along the (r, c) axes or along the (x, y) axes. If the (r, c) axes are used, the receiving device may be made aware of the non-orthogonal nature of the two axes. As such, the receiving device may receive, from the transmitting device, signaling indicating geometric information including the arrangement of the hexagonal lattice of the antenna elements 405, a minimum separation distance between the antenna elements 405 (e.g., a half of a wavelength), indices of antenna elements 405 along the (r, c) axis, or any combination thereof. For example, the receiving device may receive an indication that a reference signal is associated with the antenna elements 405 arranged in the hexagonal antenna array 400, and the indication may include information associated with a set of two or more antenna elements 405 including separation information for the antenna elements 405, an index for each antenna element 405 (e.g., corresponding to a row and a column), or any combination thereof. If the (x, y) axes are used, the receiving device may be aware of the hexagonal nature of the lattice of antenna elements 405 (e.g., the receiving device may be aware of the rectangular indices of the transmitting antenna elements 405). In some examples, if the hexagonal antenna array 400 is offset from a rectangular antenna array, the geometric information may include information relating to the offset.

In some examples, for 3D beamforming, instead of receiving multiple reference signals, an originally-intended receiving device may receive a single reference signal, such that multiple antenna elements 405 (receive antenna elements) in the hexagonal antenna array 400 may perform channel estimation. As such, the actual receiving device may estimate the channel from the received waveform and recover the phase terms for the converging spherical wave (e.g., reverse propagation) based on reciprocity. For example, the transmitting device (e.g., a base station) may receive a reference signal from the receiving device (e.g., a UE) using two or more antenna elements 405. The transmitting device may perform a measurement of a waveform corresponding to the one or more directional beams based on receiving the reference signal, and the transmitting device may determine a phase for a 3D beam corresponding to the one or more directional beams based on reciprocity between the measured waveform and the 3D beam.

Figure 5:
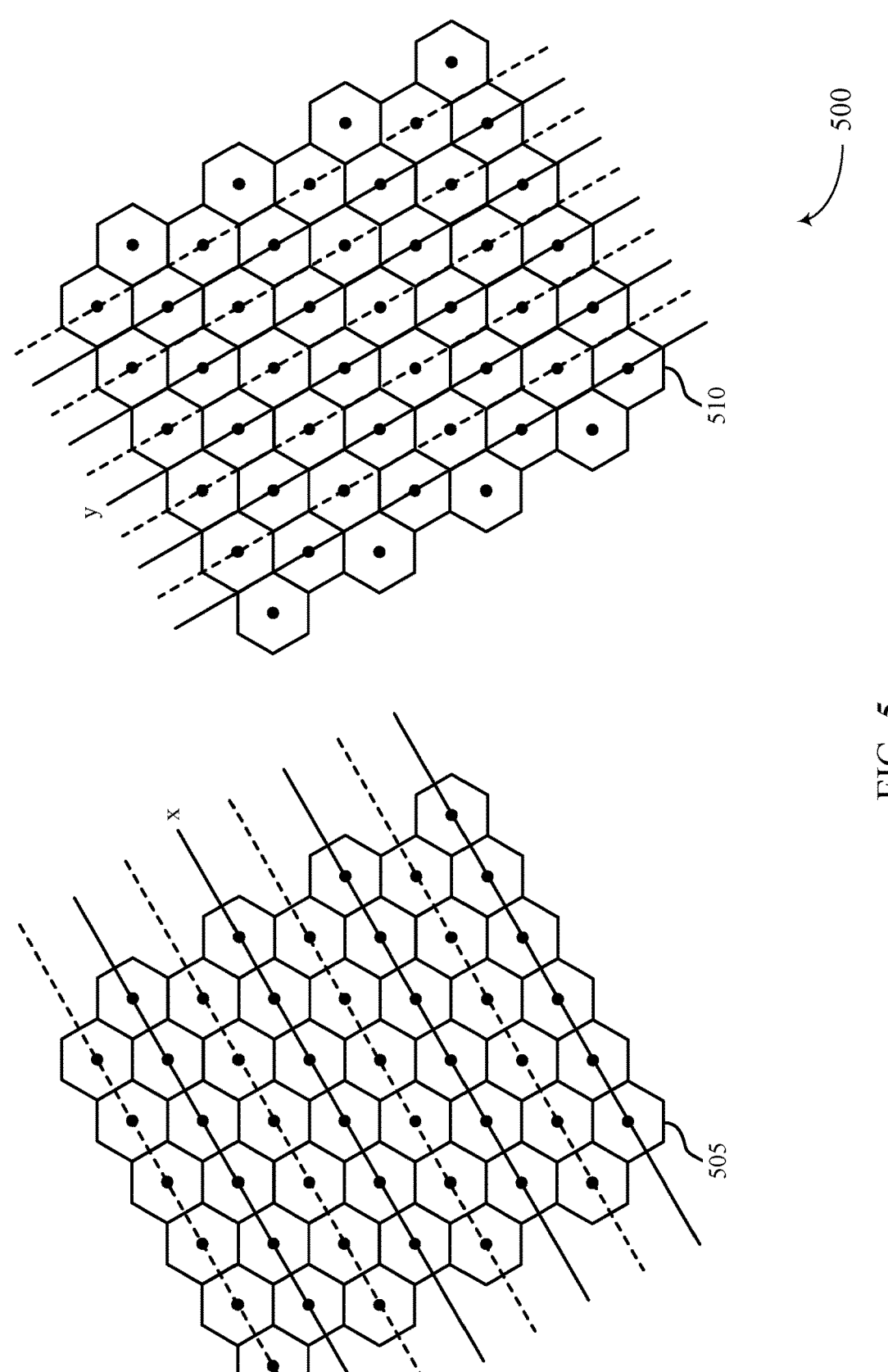

FIG. 5 illustrates an example of a hexagonal antenna array 500 that supports a hexagonal antenna lattice for MIMO communications with beamforming in accordance with aspects of the present disclosure. In some examples, the hexagonal antenna array 500 may implement aspects of the wireless communications system 100 or may be implemented by aspects of the wireless communications system 100. The hexagonal antenna array 500 may include antenna elements 505 and antenna elements 510.

The hexagonal antenna array 500 may support techniques for beamforming for MIMO communications (e.g., 3D beamforming, holographic MIMO). In some examples, the hexagonal antenna array 500 may be interpreted as two rectangular antenna arrays (e.g., two rectangular lattices) placed together with an offset along each of the x-direction and the y-direction, which may enable viewing of the hexagonal lattice to achieve an angle of departure with respect to the x-axis (e.g., $\theta_{0,x}$) and the y-axis (e.g., $\theta_{0,y}$). For example, the hexagonal antenna array 500 may be offset along the x-direction such that the antenna elements 505 may transmit signals using directional beams aligned with the x-axis, and the hexagonal antenna array 500 may be offset along the y-axis such that the antenna elements 510 may transmit using directional beams aligned with the y-axis. In such cases, along each of the x and y-axes, the hexagonal antenna array 500 may correspond to two rectangular lattices with an offset. Such configuration may enable a device to achieve some angle of departure with respect to the x-axis and the y-axis.

In some examples, a first wireless device (e.g., a base station) may transmit one or more reference signals to a second wireless device (e.g., a UE), where the one or more reference signals may be transmitted using a set of two or more antenna elements (e.g., the antenna elements 505, the antenna elements 510) from the hexagonal antenna array 500 arranged in a hexagonal configuration for the first wireless device. In some examples, the two or more antenna elements may include one or more antenna elements associated with a first axis of the hexagonal configuration (e.g., the x-axis) and one or more antenna elements associated with a second axis of the hexagonal configuration (e.g., the y-axis), where the first axis and the second axis may be orthogonal and where the one or more antenna elements associated with the first axis are offset with respect to the one or more antenna elements associated with the second axis. In such cases, the offset between the antenna elements may be explicitly signaling to another device.

Figure 6:
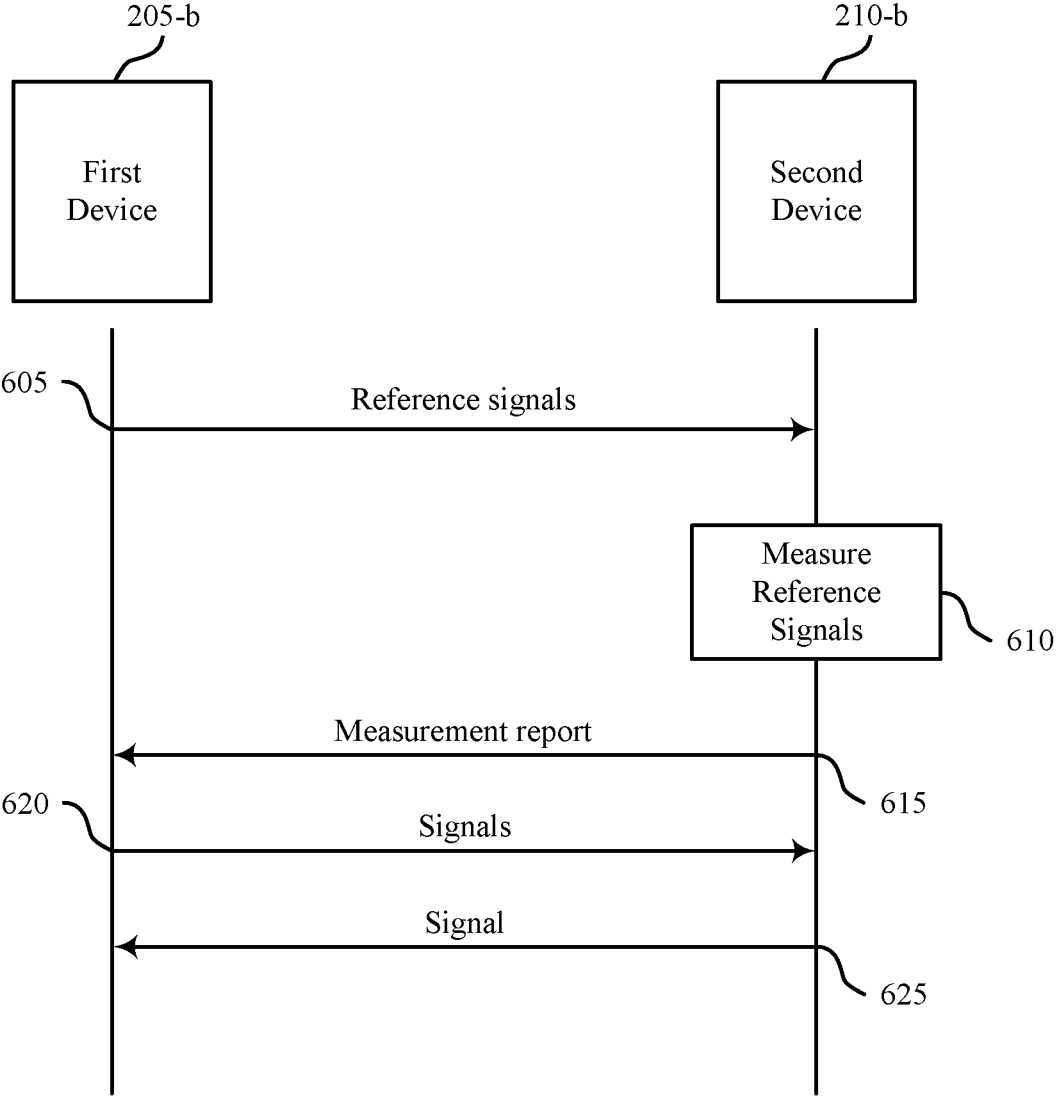
FIG. 6 illustrates an example of a process flow in a system that supports a hexagonal antenna lattice for MIMO communications with beamforming in accordance with aspects of the present disclosure.

FIG. 6 illustrates an example of a process flow 600 in a system that supports a hexagonal antenna lattice for MIMO communications with beamforming in accordance with aspects of the present disclosure. The process flow 600 may implement aspects of wireless communications systems 100 and 200, or may be implemented by aspects of the wireless communications system 100 and 200. For example, the process flow 600 may illustrate operations between a first device 205-b and a second device 210-b, which may be examples of corresponding devices described herein. In the following description of the process flow 600, the operations between the first device 205-b and the second device 210-b may be transmitted in a different order than the example order shown, or the operations performed by the first device 205-b and the second device 210-b may be performed in different orders or at different times. Some operations may also be omitted from the process flow 600, and other operations may be added to the process flow 600.

At 605, the first device 205-b (e.g., a base station) may transmit one or more reference signals via one or more directional beams to at least the second device 210-b (e.g., at least a first UE of multiple UEs), where the one or more reference signals are associated with a set of two or more antenna elements of an antenna panel of the first device 205-a, the antenna panel including multiple antenna elements that are arranged in a hexagonal configuration.

At 610, the second device 210-b may perform measurements of the one or more reference signals. For example, the second device 210-b may perform channel estimation based on multiple antenna elements associated with the first device 205-b.

At 615, the first device 205-b may receive, from the second device 210-b, a measurement report based on the measurements of the one or more reference signals and the multiple antenna elements arranged in the hexagonal configuration at the first device 205-b. In some examples, the measurement report may include geometric information such as the hexagonal configuration, a minimum separation between each antenna element in the antenna panel (e.g., a half of a wavelength), indices of transmitting antenna elements along the (r, c) axis, or any combination thereof.

At 620, the first device 205-b may transmit one or more signals to the second device 210-b using the antenna panel, where the one or more signals are transmitted using one or more directional beams for MIMO communications. In some examples, the directional beams may be generated based on the antenna elements arranged in the hexagonal configuration, and may be used for angular beamforming, 3D beamforming, or any combination thereof. At 625, the first device 205-b may receive, from the second device 210-b, a signal using the antenna elements of the antenna panel.

Figure 7:
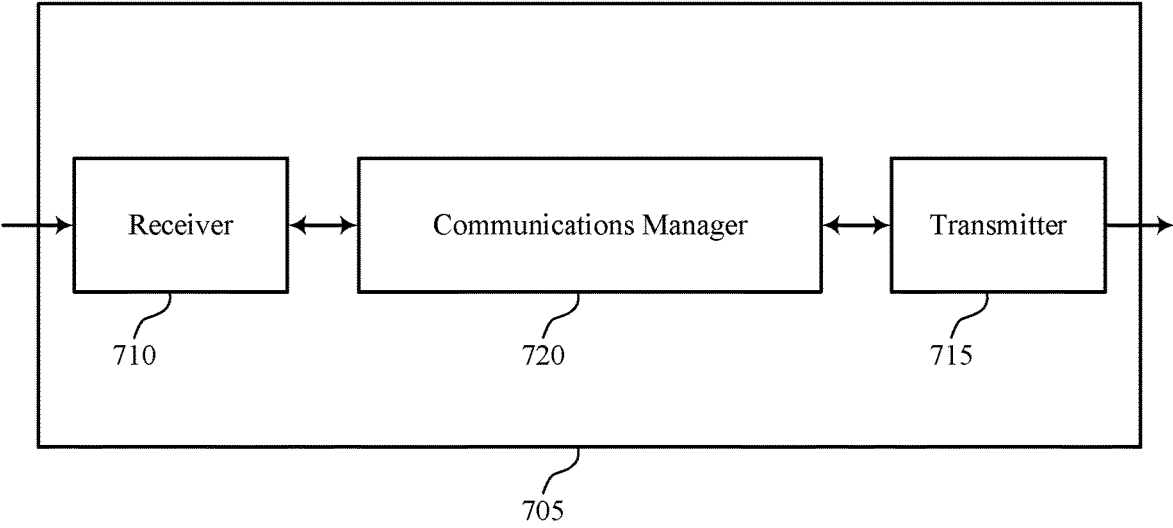
FIGS. 7 and 8 show block diagrams of devices that support a hexagonal antenna lattice for MIMO communications with beamforming in accordance with aspects of the present disclosure.

FIG. 7 shows a block diagram 700 of a device 705 that supports a hexagonal antenna lattice for MIMO communications with beamforming in accordance with aspects of the present disclosure. The device 705 may be an example of aspects of a UE 115 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to hexagonal antenna lattice for MIMO communications with beamforming). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to hexagonal antenna lattice for MIMO communications with beamforming). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of hexagonal antenna lattice for MIMO communications with beamforming as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first wireless device in accordance with examples as disclosed herein. For example, the communications manager 720 may be configured as or otherwise support a means for transmitting one or more signals to one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration. The communications manager 720 may be configured as or otherwise support a means for receiving, from at least one wireless device of the one or more wireless devices, a signal using the set of multiple antenna elements of the antenna panel.

Additionally or alternatively, the communications manager 720 may support wireless communications at a first wireless device in accordance with examples as disclosed herein. For example, the communications manager 720 may be configured as or otherwise support a means for receiving, from a second wireless device, one or more reference signals via one or more directional beams, where the one or more reference signals are associated with a set of two or more antenna elements of an antenna panel of the second wireless device, the antenna panel including a set of multiple antenna elements that are arranged in a hexagonal configuration. The communications manager 720 may be configured as or otherwise support a means for performing measurements of the one or more reference signals. The communications manager 720 may be configured as or otherwise support a means for transmitting, to the second wireless device, a measurement report based on the measurements of the one or more reference signals and the set of multiple antenna elements arranged in the hexagonal configuration.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for a hexagonal antenna lattice for MIMO communications which may increase efficiency in beamforming and reduce coupling between antenna elements in the hexagonal antenna lattice.

Figure 8:
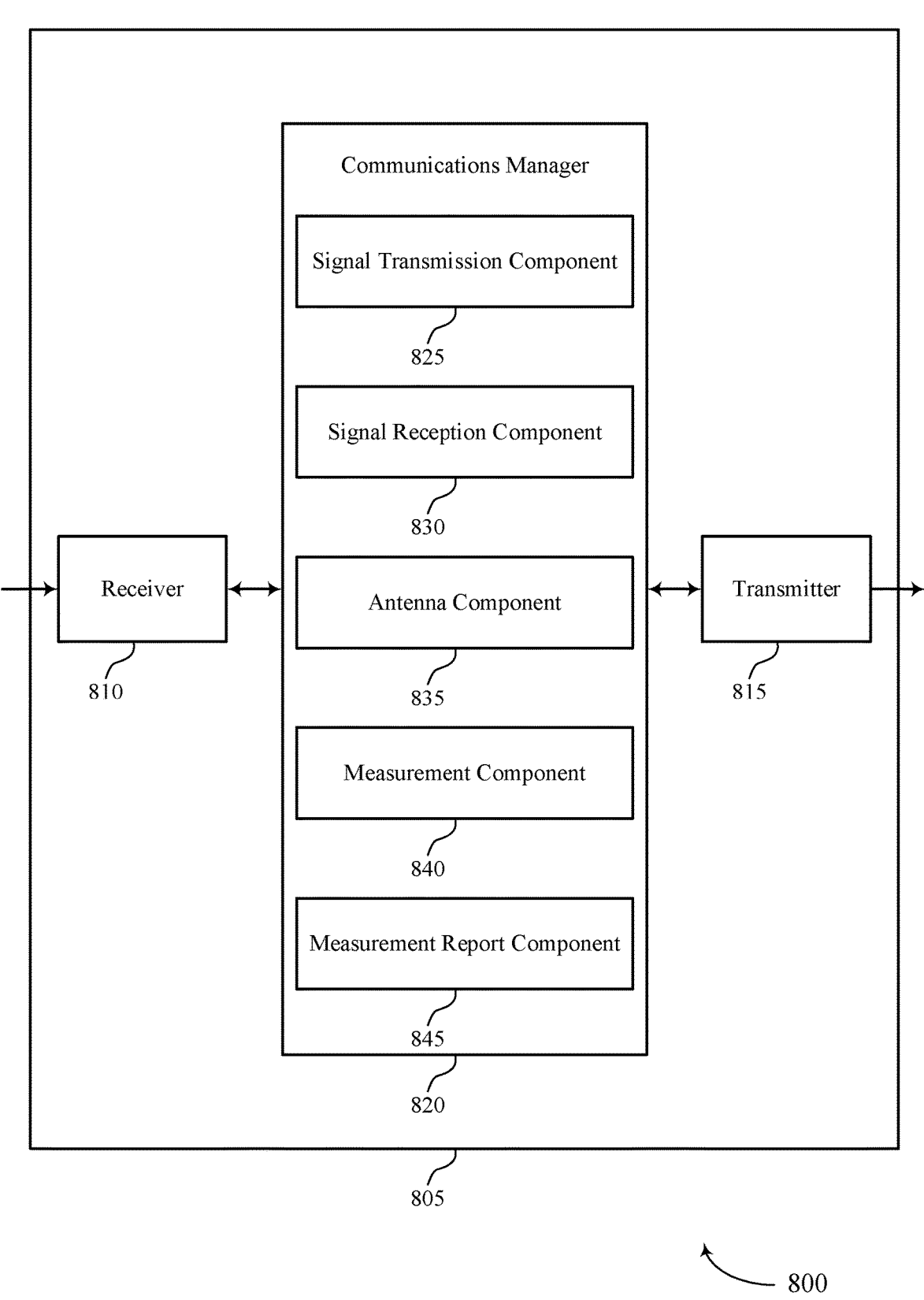

FIG. 8 shows a block diagram 800 of a device 805 that supports a hexagonal antenna lattice for MIMO communications with beamforming in accordance with aspects of the present disclosure. The device 805 may be an example of aspects of a device 705, a UE 115, or a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to hexagonal antenna lattice for MIMO communications with beamforming). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to hexagonal antenna lattice for MIMO communications with beamforming). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of hexagonal antenna lattice for MIMO communications with beamforming as described herein. For example, the communications manager 820 may include a signal transmission component 825, a signal reception component 830, an antenna component 835, a measurement component 840, a measurement report component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first wireless device in accordance with examples as disclosed herein. The signal transmission component 825 may be configured as or otherwise support a means for transmitting one or more signals to one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration. The signal reception component 830 may be configured as or otherwise support a means for receiving, from at least one wireless device of the one or more wireless devices, a signal using the set of multiple antenna elements of the antenna panel.

Additionally or alternatively, the communications manager 820 may support wireless communications at a first wireless device in accordance with examples as disclosed herein. The antenna component 835 may be configured as or otherwise support a means for receiving, from a second wireless device, one or more reference signals via one or more directional beams, where the one or more reference signals are associated with a set of two or more antenna elements of an antenna panel of the second wireless device, the antenna panel including a set of multiple antenna elements that are arranged in a hexagonal configuration. The measurement component 840 may be configured as or otherwise support a means for performing measurements of the one or more reference signals. The measurement report component 845 may be configured as or otherwise support a means for transmitting, to the second wireless device, a measurement report based on the measurements of the one or more reference signals and the set of multiple antenna elements arranged in the hexagonal configuration.

Figure 9:
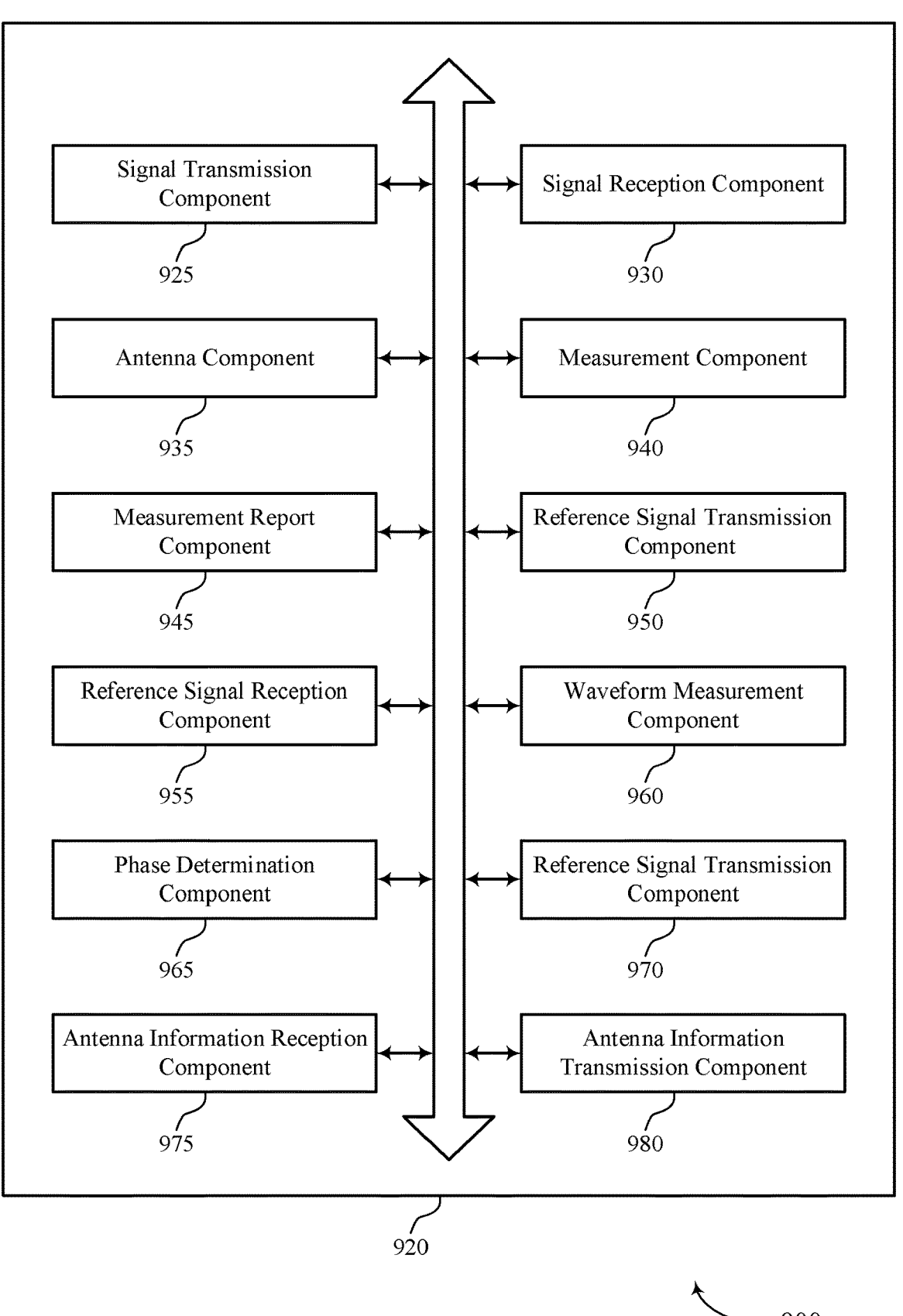
FIG. 9 shows a block diagram of a communications manager that supports a hexagonal antenna lattice for MIMO communications with beamforming in accordance with aspects of the present disclosure.

FIG. 9 shows a block diagram 900 of a communications manager 920 that supports a hexagonal antenna lattice for MIMO communications with beamforming in accordance with aspects of the present disclosure. The communications manager 920 may be an example of aspects of a communications manager 720, a communications manager 820, or both, as described herein. The communications manager 920, or various components thereof, may be an example of means for performing various aspects of hexagonal antenna lattice for MIMO communications with beamforming as described herein. For example, the communications manager 920 may include a signal transmission component 925, a signal reception component 930, an antenna component 935, a measurement component 940, a measurement report component 945, a reference signal transmission component 950, a reference signal reception component 955, a waveform measurement component 960, a phase determination component 965, a reference signal transmission component 970, an antenna information reception component 975, an antenna information transmission component 980, or any combination thereof. Each of these components may communicate, directly or indirectly, with one another (e.g., via one or more buses).

The communications manager 920 may support wireless communication at a first wireless device in accordance with examples as disclosed herein. The signal transmission component 925 may be configured as or otherwise support a means for transmitting one or more signals to one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration. The signal reception component 930 may be configured as or otherwise support a means for receiving, from at least one wireless device of the one or more wireless devices, a signal using the set of multiple antenna elements of the antenna panel.

In some examples, the reference signal transmission component 950 may be configured as or otherwise support a means for transmitting one or more reference signals to the at least one wireless device of the one or more wireless devices, where the one or more reference signals are transmitted using a set of two or more antenna elements from the set of multiple antenna elements.

In some examples, the set of two or more antenna elements includes one or more antenna elements associated with a first axis of the hexagonal configuration and one or more antenna elements associated with a second axis of the hexagonal configuration, the first axis being non-orthogonal to the second axis.

In some examples, the antenna information transmission component 980 may be configured as or otherwise support a means for transmitting, to the at least one wireless device, an indication that the one or more reference signals are associated with the set of multiple antenna elements arranged in the hexagonal configuration, where the indication includes information associated with the set of two or more antenna elements.

In some examples, the information associated with the set of two or more antenna elements includes separation information for the set of multiple antenna elements, an index for each antenna element of the set of two or more antenna elements, or any combination thereof.

In some examples, the set of two or more antenna elements include one or more antenna elements associated with a third axis of the hexagonal configuration and one or more antenna elements associated with a fourth axis of the hexagonal configuration, the third axis being orthogonal to the fourth axis, and where the one or more antenna elements associated with the third axis are offset with respect to the one or more antenna elements associated with the fourth axis.

In some examples, the reference signal reception component 955 may be configured as or otherwise support a means for receiving a reference signal from a wireless device of the one or more wireless devices using two or more antenna elements of the set of multiple antenna elements. In some examples, the waveform measurement component 960 may be configured as or otherwise support a means for performing a measurement of a waveform corresponding to the one or more directional beams based on receiving the reference signal. In some examples, the phase determination component 965 may be configured as or otherwise support a means for determining a phase for a 3D beam corresponding to the one or more directional beams based on reciprocity between the measured waveform and the 3D beam.

In some examples, the phase determination component 965 may be configured as or otherwise support a means for determining an index corresponding to each antenna element of the set of multiple antenna elements, the index including a row index and a column index, where the one or more signals are transmitted based on the index corresponding to each antenna element of the set of multiple antenna elements. In some examples, the row index coincides with an x-axis and the column index is projected onto the x-axis, a y-axis, or both, in a 3D coordinate system.

In some examples, to support a phase portion of a first signal transmitted using the antenna panel, the phase determination component 965 may be configured as or otherwise support a means for $$\exp\left[\frac{i2\pi}{\lambda}\left[r + c\cos\left(\frac{\pi}{3}\right)\right]\sin\theta_{0,x} + c\sin\left(\frac{\pi}{3}\right)\sin\theta_{0,y}\right],$$

where r includes the row index, c includes the column index, $\theta_{0,x}$ includes a first beamforming angle of departure, and $\theta_{0,y}$ includes a second beamforming angle of departure.

In some examples, to support a phase portion of a first signal transmitted using the antenna panel, the phase determination component 965 may be configured as or otherwise support a means for $$\exp\left[-\frac{i2\pi r}{\lambda}\right],$$

where $r = \sqrt{z'^2 + (x-x_0)^2 + (y-y_0)^2}$, $$x = r + c\cos\left(\frac{\pi}{3}\right), \text{ and } y = c\sin\left(\frac{\pi}{3}\right),$$

and where r includes the row index, c includes the column index, and z' is associated with a location of a wireless device of the one or more wireless devices.

In some examples, each antenna element of the set of multiple antenna elements that are arranged in the hexagonal configuration is separated from an adjacent antenna element by a distance including one half of a signal wavelength supported by the antenna panel. In some examples, the one or more directional beams are associated with 3D beamforming, angular beamforming, or any combination thereof.

Additionally or alternatively, the communications manager 920 may support wireless communications at a first wireless device in accordance with examples as disclosed herein. The antenna component 935 may be configured as or otherwise support a means for receiving, from a second wireless device, one or more reference signals via one or more directional beams, where the one or more reference signals are associated with a set of two or more antenna elements of an antenna panel of the second wireless device, the antenna panel including a set of multiple antenna elements that are arranged in a hexagonal configuration. The measurement component 940 may be configured as or otherwise support a means for performing measurements of the one or more reference signals. The measurement report component 945 may be configured as or otherwise support a means for transmitting, to the second wireless device, a measurement report based on the measurements of the one or more reference signals and the set of multiple antenna elements arranged in the hexagonal configuration.

In some examples, the one or more reference signals associated with the set of two or more antenna elements include reference signals associated with one or more antenna elements associated with a first axis of the hexagonal configuration and one or more antenna elements associated with a second axis of the hexagonal configuration, the first axis being non-orthogonal to the second axis.

In some examples, the antenna information reception component 975 may be configured as or otherwise support a means for receiving, from the second wireless device, an indication that the one or more reference signals are associated with the set of multiple antenna elements arranged in the hexagonal configuration, the indication including information associated with the set of two or more antenna elements, where the measurements are performed based on the indication.

In some examples, the information associated with the set of two or more antenna elements includes separation information for the set of multiple antenna elements, an index for each antenna element of the set of two or more antenna elements, or any combination thereof.

In some examples, the one or more reference signals associated with the set of two or more antenna elements include reference signals associated with one or more antenna elements associated with a third axis of the hexagonal configuration and one or more antenna elements associated with a fourth axis of the hexagonal configuration, the third axis being orthogonal to the fourth axis, and where the one or more antenna elements associated with the third axis are offset with respect to the one or more antenna elements associated with the fourth axis.

Figure 10:
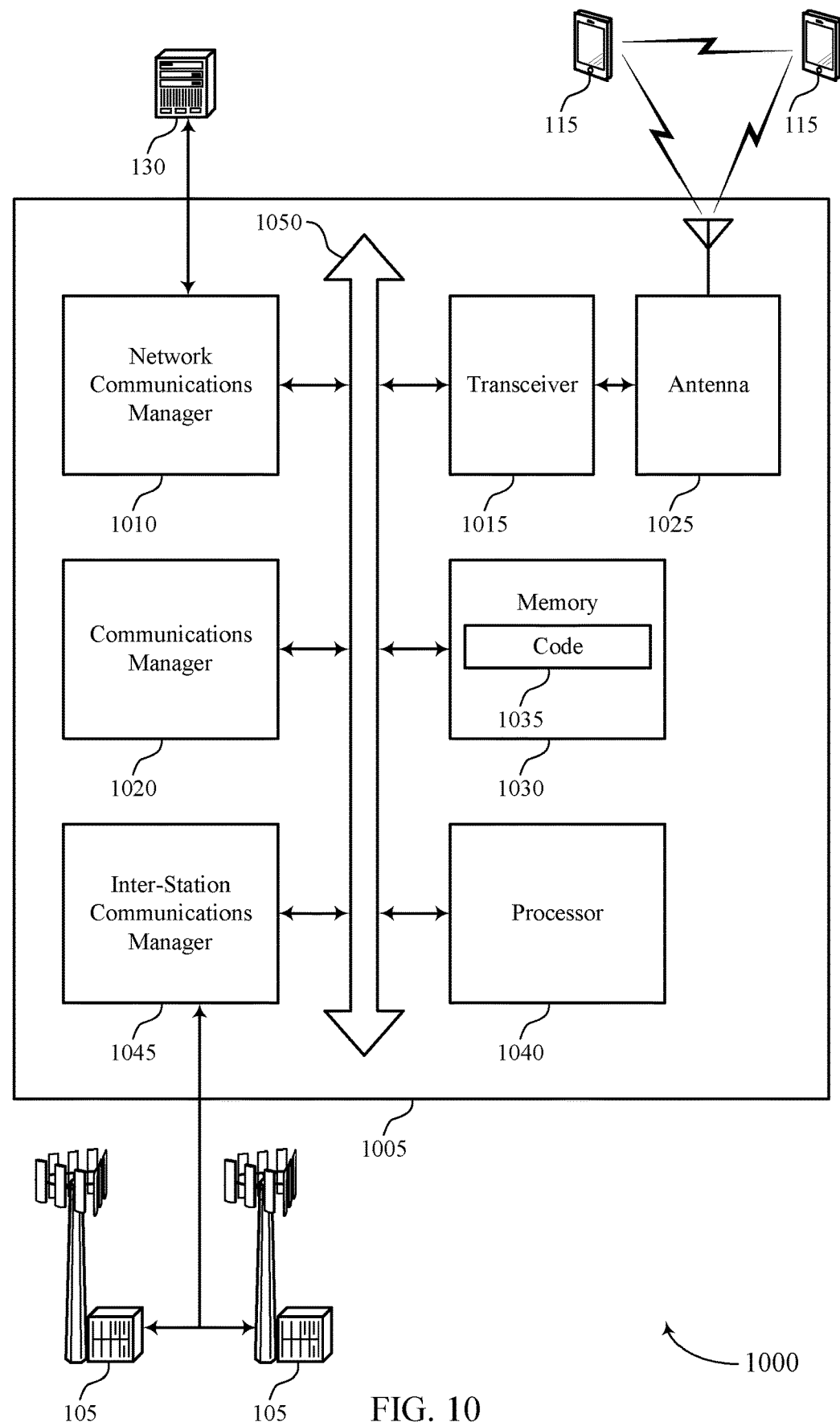
FIG. 10 shows a diagram of a system including a UE that supports a hexagonal antenna lattice for MIMO communications with beamforming in accordance with aspects of the present disclosure.

FIG. 10 shows a diagram of a system 1000 including a device 1005 that supports a hexagonal antenna lattice for MIMO communications with beamforming in accordance with aspects of the present disclosure. The device 1005 may be an example of or include the components of a device 705, a device 805, or a base station 105 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an interstation communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic input/output (I/O) system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting hexagonal antenna lattice for MIMO communications with beamforming). For example, the device 1005 or a component of the device 1005 may include a processor 1040 and memory 1030 coupled with the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

The communications manager 1020 may support wireless communication at a first wireless device in accordance with examples as disclosed herein. For example, the communications manager 1020 may be configured as or otherwise support a means for transmitting one or more signals to one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration. The communications manager 1020 may be configured as or otherwise support a means for receiving, from at least one wireless device of the one or more wireless devices, a signal using the set of multiple antenna elements of the antenna panel.

Additionally or alternatively, the communications manager 1020 may support wireless communications at a first wireless device in accordance with examples as disclosed herein. For example, the communications manager 1020 may be configured as or otherwise support a means for receiving, from a second wireless device, one or more reference signals via one or more directional beams, where the one or more reference signals are associated with a set of two or more antenna elements of an antenna panel of the second wireless device, the antenna panel including a set of multiple antenna elements that are arranged in a hexagonal configuration. The communications manager 1020 may be configured as or otherwise support a means for performing measurements of the one or more reference signals. The communications manager 1020 may be configured as or otherwise support a means for transmitting, to the second wireless device, a measurement report based on the measurements of the one or more reference signals and the set of multiple antenna elements arranged in the hexagonal configuration.

By including or configuring the communications manager 1020 in accordance with examples as described herein, the device 1005 may support techniques for a hexagonal antenna lattice for MIMO communications which may increase efficiency in beamforming and reduce coupling between antenna elements in the hexagonal antenna lattice.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of hexagonal antenna lattice for MIMO communications with beamforming as described herein, or the processor 1040 and the memory 1030 may be otherwise configured to perform or support such operations.

Figure 11:
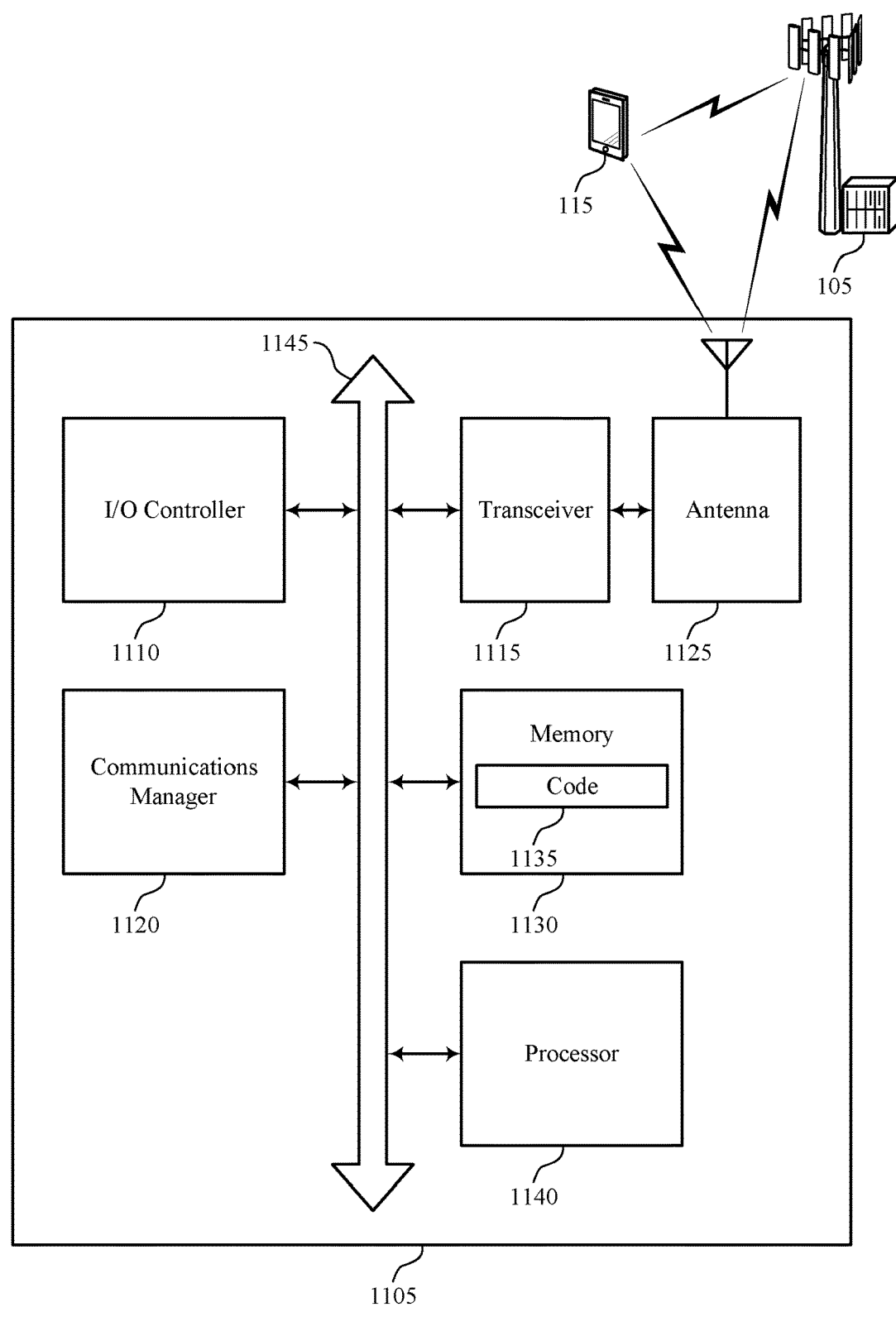
FIG. 11 shows a diagram of a system including a base station that supports a hexagonal antenna lattice for MIMO communications with beamforming in accordance with aspects of the present disclosure.

FIG. 11 shows a diagram of a system 1100 including a device 1105 that supports a hexagonal antenna lattice for MIMO communications with beamforming in accordance with aspects of the present disclosure. The device 1105 may be an example of or include the components of a device 705, a device 805, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an I/O controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 715, a transmitter 815, a receiver 710, a receiver 810, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting hexagonal antenna lattice for MIMO communications with beamforming). For example, the device 1105 or a component of the device 1105 may include a processor 1140 and memory 1130 coupled with the processor 1140, the processor 1140 and memory 1130 configured to perform various functions described herein.

The communications manager 1120 may support wireless communication at a first wireless device in accordance with examples as disclosed herein. For example, the communications manager 1120 may be configured as or otherwise support a means for transmitting one or more signals to one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration. The communications manager 1120 may be configured as or otherwise support a means for receiving, from at least one wireless device of the one or more wireless devices, a signal using the set of multiple antenna elements of the antenna panel.

Additionally or alternatively, the communications manager 1120 may support wireless communications at a first wireless device in accordance with examples as disclosed herein. For example, the communications manager 1120 may be configured as or otherwise support a means for receiving, from a second wireless device, one or more reference signals via one or more directional beams, where the one or more reference signals are associated with a set of two or more antenna elements of an antenna panel of the second wireless device, the antenna panel including a set of multiple antenna elements that are arranged in a hexagonal configuration. The communications manager 1120 may be configured as or otherwise support a means for performing measurements of the one or more reference signals. The communications manager 1120 may be configured as or otherwise support a means for transmitting, to the second wireless device, a measurement report based on the measurements of the one or more reference signals and the set of multiple antenna elements arranged in the hexagonal configuration.

By including or configuring the communications manager 1120 in accordance with examples as described herein, the device 1105 may support techniques for a hexagonal antenna lattice for MIMO communications which may increase efficiency in beamforming and reduce coupling between antenna elements in the hexagonal antenna lattice.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of hexagonal antenna lattice for MIMO communications with beamforming as described herein, or the processor 1140 and the memory 1130 may be otherwise configured to perform or support such operations.

FIG. 12 shows a flowchart illustrating a method 1200 that supports a hexagonal antenna lattice for MIMO communications with beamforming in accordance with aspects of the present disclosure. The operations of the method 1200 may be implemented by a base station or a UE or its components as described herein. For example, the operations of the method 1200 may be performed by a base station 105 or a UE 115 as described with reference to FIGS. 1 through 11. In some examples, a base station or a UE may execute a set of instructions to control the functional elements of the base station or the UE to perform the described functions. Additionally or alternatively, the base station or the UE may perform aspects of the described functions using special-purpose hardware.

At 1205, the method may include transmitting one or more signals to one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration. The operations of 1205 may be performed in accordance with examples as disclosed herein. In some examples, aspects of the operations of 1205 may be performed by a signal transmission component 925 as described with reference to FIG. 9.

At 1210, the method may include receiving, from at least one wireless device of the one or more wireless devices, a signal using the set of multiple antenna elements of the antenna panel. The operations of 1210 may be performed in accordance with examples as disclosed herein. In some examples, aspects of the operations of 1210 may be performed by a signal reception component 930 as described with reference to FIG. 9.

FIG. 13 shows a flowchart illustrating a method 1300 that supports a hexagonal antenna lattice for MIMO communications with beamforming in accordance with aspects of the present disclosure. The operations of the method 1300 may be implemented by a base station or a UE or its components as described herein. For example, the operations of the method 1300 may be performed by a base station 105 or a UE 115 as described with reference to FIGS. 1 through 11. In some examples, a base station or a UE may execute a set of instructions to control the functional elements of the base station or the UE to perform the described functions. Additionally or alternatively, the base station or the UE may perform aspects of the described functions using special-purpose hardware.

At 1305, the method may include transmitting one or more reference signals to at least one wireless device of one or more wireless devices, where the one or more reference signals are transmitted using a set of two or more antenna elements from the set of multiple antenna elements. The operations of 1305 may be performed in accordance with examples as disclosed herein. In some examples, aspects of the operations of 1305 may be performed by a reference signal transmission component 950 as described with reference to FIG. 9.

At 1310, the method may include transmitting one or more signals to the one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration. The operations of 1310 may be performed in accordance with examples as disclosed herein. In some examples, aspects of the operations of 1310 may be performed by a signal transmission component 925 as described with reference to FIG. 9.

At 1315, the method may include receiving, from at least one wireless device of the one or more wireless devices, a signal using the set of multiple antenna elements of the antenna panel. The operations of 1315 may be performed in accordance with examples as disclosed herein. In some examples, aspects of the operations of 1315 may be performed by a signal reception component 930 as described with reference to FIG. 9.

FIG. 14 shows a flowchart illustrating a method 1400 that supports a hexagonal antenna lattice for MIMO communications with beamforming in accordance with aspects of the present disclosure. The operations of the method 1400 may be implemented by a base station or a UE or its components as described herein. For example, the operations of the method 1400 may be performed by a base station 105 or a UE 115 as described with reference to FIGS. 1 through 11. In some examples, a base station or a UE may execute a set of instructions to control the functional elements of the base station or the UE to perform the described functions. Additionally or alternatively, the base station or the UE may perform aspects of the described functions using special-purpose hardware.

At 1405, the method may include transmitting one or more signals to one or more wireless devices using an antenna panel including a set of multiple antenna elements that are arranged in a hexagonal configuration, the one or more signals being transmitted using one or more directional beams for MIMO communications with the one or more wireless devices, where the one or more directional beams are generated based on the set of multiple antenna elements arranged in the hexagonal configuration. The operations of 1405 may be performed in accordance with examples as disclosed herein. In some examples, aspects of the operations of 1405 may be performed by a signal transmission component 925 as described with reference to FIG. 9.

At 1410, the method may include receiving, from at least one wireless device of the one or more wireless devices, a signal using the set of multiple antenna elements of the antenna panel. The operations of 1410 may be performed in accordance with examples as disclosed herein. In some examples, aspects of the operations of 1410 may be performed by a signal reception component 930 as described with reference to FIG. 9.

At 1415, the method may include receiving a reference signal from a wireless device of the one or more wireless devices using two or more antenna elements of the set of multiple antenna elements. The operations of 1415 may be performed in accordance with examples as disclosed herein. In some examples, aspects of the operations of 1415 may be performed by a reference signal reception component 955 as described with reference to FIG. 9.

At 1420, the method may include performing a measurement of a waveform corresponding to the one or more directional beams based on receiving the reference signal. The operations of 1420 may be performed in accordance with examples as disclosed herein. In some examples, aspects of the operations of 1420 may be performed by a waveform measurement component 960 as described with reference to FIG. 9.

At 1425, the method may include determining a phase for a 3D beam corresponding to the one or more directional beams based on reciprocity between the measured waveform and the 3D beam. The operations of 1425 may be performed in accordance with examples as disclosed herein. In some examples, aspects of the operations of 1425 may be performed by a phase determination component 965 as described with reference to FIG. 9.

FIG. 15 shows a flowchart illustrating a method 1500 that supports a hexagonal antenna lattice for MIMO communications with beamforming in accordance with aspects of the present disclosure. The operations of the method 1500 may be implemented by a base station or a UE or its components as described herein. For example, the operations of the method 1500 may be performed by a base station 105 or a UE 115 as described with reference to FIGS. 1 through 11. In some examples, a base station or a UE may execute a set of instructions to control the functional elements of the base station or the UE to perform the described functions. Additionally or alternatively, the base station or the UE may perform aspects of the described functions using special-purpose hardware.

At 1505, the method may include receiving, from a second wireless device, one or more reference signals via one or more directional beams, where the one or more reference signals are associated with a set of two or more antenna elements of an antenna panel of the second wireless device, the antenna panel including a set of multiple antenna elements that are arranged in a hexagonal configuration. The operations of 1505 may be performed in accordance with examples as disclosed herein. In some examples, aspects of the operations of 1505 may be performed by an antenna component 935 as described with reference to FIG. 9.

At 1510, the method may include performing measurements of the one or more reference signals. The operations of 1510 may be performed in accordance with examples as disclosed herein. In some examples, aspects of the operations of 1510 may be performed by a measurement component 940 as described with reference to FIG. 9.

At 1515, the method may include transmitting, to the second wireless device, a measurement report based on the measurements of the one or more reference signals and the set of multiple antenna elements arranged in the hexagonal configuration. The operations of 1515 may be performed in accordance with examples as disclosed herein. In some examples, aspects of the operations of 1515 may be performed by a measurement report component 945 as described with reference to FIG. 9.

FIG. 16 shows a flowchart illustrating a method 1600 that supports a hexagonal antenna lattice for MIMO communications with beamforming in accordance with aspects of the present disclosure. The operations of the method 1600 may be implemented by a base station or a UE or its components as described herein. For example, the operations of the method 1600 may be performed by a base station 105 or a UE 115 as described with reference to FIGS. 1 through 11. In some examples, a base station or a UE may execute a set of instructions to control the functional elements of the base station or the UE to perform the described functions. Additionally or alternatively, the base station or the UE may perform aspects of the described functions using special-purpose hardware.

At 1605, the method may include receiving, from a second wireless device, one or more reference signals via one or more directional beams, where the one or more reference signals are associated with a set of two or more antenna elements of an antenna panel of the second wireless device, the antenna panel including a set of multiple antenna elements that are arranged in a hexagonal configuration. The operations of 1605 may be performed in accordance with examples as disclosed herein. In some examples, aspects of the operations of 1605 may be performed by an antenna component 935 as described with reference to FIG. 9.

At 1610, the method may include receiving, from the second wireless device, an indication that the one or more reference signals are associated with the set of multiple antenna elements arranged in the hexagonal configuration, the indication including information associated with the set of two or more antenna elements. The operations of 1610 may be performed in accordance with examples as disclosed herein. In some examples, aspects of the operations of 1610 may be performed by an antenna information reception component 975 as described with reference to FIG. 9.

At 1615, the method may include performing measurements of the one or more reference signals based on the indication. The operations of 1615 may be performed in accordance with examples as disclosed herein. In some examples, aspects of the operations of 1615 may be performed by a measurement component 940 as described with reference to FIG. 9.

At 1620, the method may include transmitting, to the second wireless device, a measurement report based on the measurements of the one or more reference signals and the set of multiple antenna elements arranged in the hexagonal configuration. The operations of 1620 may be performed in accordance with examples as disclosed herein. In some examples, aspects of the operations of 1620 may be performed by a measurement report component 945 as described with reference to FIG. 9.

The following provides an overview of aspects of the present disclosure:

Aspect 1: A method for wireless communication at a first wireless device, comprising: transmitting one or more signals to one or more wireless devices using an antenna panel comprising a plurality of antenna elements that are arranged in a hexagonal configuration, the one or more signals being transmitted using one or more directional beams for MIMO communications with the one or more wireless devices, wherein the one or more directional beams are generated based at least in part on the plurality of antenna elements arranged in the hexagonal configuration; and receiving, from at least one wireless device of the one or more wireless devices, a signal using the plurality of antenna elements of the antenna panel.

Aspect 2: The method of aspect 1, further comprising: transmitting one or more reference signals to the at least one wireless device of the one or more wireless devices, wherein the one or more reference signals are transmitted using a set of two or more antenna elements from the plurality of antenna elements.

Aspect 3: The method of aspect 2, wherein the set of two or more antenna elements comprises one or more antenna elements associated with a first axis of the hexagonal configuration and one or more antenna elements associated with a second axis of the hexagonal configuration, the first axis being non-orthogonal to the second axis.

Aspect 4: The method of aspect 3, further comprising: transmitting, to the at least one wireless device, an indication that the one or more reference signals are associated with the plurality of antenna elements arranged in the hexagonal configuration, wherein the indication comprises information associated with the set of two or more antenna elements.

Aspect 5: The method of aspect 4, wherein the information associated with the set of two or more antenna elements comprises separation information for the plurality of antenna elements, an index for each antenna element of the set of two or more antenna elements, or any combination thereof.

Aspect 6: The method of any of aspects 2 through 5, wherein the set of two or more antenna elements comprise one or more antenna elements associated with a third axis of the hexagonal configuration and one or more antenna elements associated with a fourth axis of the hexagonal configuration, the third axis being orthogonal to the fourth axis, and wherein the one or more antenna elements associated with the third axis are offset with respect to the one or more antenna elements associated with the fourth axis.

Aspect 7: The method of any of aspects 1 through 6, further comprising: receiving a reference signal from a wireless device of the one or more wireless devices using two or more antenna elements of the plurality of antenna elements; performing a measurement of a waveform corresponding to the one or more directional beams based at least in part on receiving the reference signal; and determining a phase for a 3D beam corresponding to the one or more directional beams based at least in part on reciprocity between the measured waveform and the 3D beam.

Aspect 8: The method of any of aspects 1 through 7, further comprising: determining an index corresponding to each antenna element of the plurality of antenna elements, the index comprising a row index and a column index, wherein the one or more signals are transmitted based at least in part on the index corresponding to each antenna element of the plurality of antenna elements.

Aspect 9: The method of aspect 8, wherein the row index coincides with an x-axis and the column index is projected onto the x-axis, a y-axis, or both, in a 3D coordinate system.

Aspect 10: The method of any of aspects 8 through 9, wherein a phase portion of a first signal transmitted using the antenna panel comprises:

$$\exp\left[\frac{i2\pi}{\lambda}\left[r + c\cos\left(\frac{\pi}{3}\right)\right]\sin\theta_{0,x} + c\sin\left(\frac{\pi}{3}\right)\sin\theta_{0,y}\right],$$

wherein r comprises the row index, c comprises the column index, $\theta_{0,x}$ comprises a first beamforming angle of departure, and $\theta_{0,y}$ comprises a second beamforming angle of departure.

Aspect 11: The method of any of aspects 8 through 10, wherein a phase portion of a first signal transmitted using the antenna panel comprises:

$$\exp\left[-\frac{i2\pi r}{\lambda}\right],$$

wherein $r=\sqrt{z'^2+(x-x_0)^2+(y-y_0)^2}$, $$x = r + c\cos\left(\frac{\pi}{3}\right), \text{ and } y = c\sin\left(\frac{\pi}{3}\right),$$

and wherein r comprises the row index, c comprises the column index, and z' is associated with a location of a wireless device of the one or more wireless devices.

Aspect 12: The method of any of aspects 1 through 11, wherein each antenna element of the plurality of antenna elements that are arranged in the hexagonal configuration is separated from an adjacent antenna element by a distance comprising one half of a signal wavelength supported by the antenna panel.

Aspect 13: The method of any of aspects 1 through 12, wherein the one or more directional beams are associated with 3D beamforming, angular beamforming, or any combination thereof.

Aspect 14: A method for wireless communications at a first wireless device, comprising: receiving, from a second wireless device, one or more reference signals via one or more directional beams, wherein the one or more reference signals are associated with a set of two or more antenna elements of an antenna panel of the second wireless device, the antenna panel comprising a plurality of antenna elements that are arranged in a hexagonal configuration; performing measurements of the one or more reference signals; and transmitting, to the second wireless device, a measurement report based at least in part on the measurements of the one or more reference signals and the plurality of antenna elements arranged in the hexagonal configuration.

Aspect 15: The method of aspect 14, wherein the one or more reference signals associated with the set of two or more antenna elements comprise reference signals associated with one or more antenna elements associated with a first axis of the hexagonal configuration and one or more antenna elements associated with a second axis of the hexagonal configuration, the first axis being non-orthogonal to the second axis.

Aspect 16: The method of aspect 15, further comprising: receiving, from the second wireless device, an indication that the one or more reference signals are associated with the plurality of antenna elements arranged in the hexagonal configuration, the indication comprising information associated with the set of two or more antenna elements, wherein the measurements are performed based at least in part on the indication.

Aspect 17: The method of aspect 16, wherein the information associated with the set of two or more antenna elements comprises separation information for the plurality of antenna elements, an index for each antenna element of the set of two or more antenna elements, or any combination thereof.

Aspect 18: The method of any of aspects 16 through 17, wherein the one or more reference signals associated with the set of two or more antenna elements comprise reference signals associated with one or more antenna elements associated with a third axis of the hexagonal configuration and one or more antenna elements associated with a fourth axis of the hexagonal configuration, the third axis being orthogonal to the fourth axis, and wherein the one or more antenna elements associated with the third axis are offset with respect to the one or more antenna elements associated with the fourth axis.

Aspect 19: An apparatus for wireless communication at a first wireless device, comprising an antenna panel comprising a plurality of antenna elements arranged in a hexagonal configuration, a processor; memory coupled with the processor; and instructions stored in the memory and executable by the processor to cause the apparatus to perform a method of any of aspects 1 through 13.

Aspect 20: An apparatus for wireless communication at a first wireless device, comprising at least one means for performing a method of any of aspects 1 through 13.

Aspect 21: A non-transitory computer-readable medium storing code for wireless communication at a first wireless device, the code comprising instructions executable by a processor to perform a method of any of aspects 1 through 13.

Aspect 22: An apparatus for wireless communications at a first wireless device, comprising an antenna panel comprising a plurality of antenna elements arranged in a hexagonal configuration, a processor; memory coupled with the processor; and instructions stored in the memory and executable by the processor to cause the apparatus to perform a method of any of aspects 14 through 18.

Aspect 23: An apparatus for wireless communications at a first wireless device, comprising at least one means for performing a method of any of aspects 14 through 18.

Aspect 24: A non-transitory computer-readable medium storing code for wireless communications at a first wireless device, the code comprising instructions executable by a processor to perform a method of any of aspects 14 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:

transmitting one or more signals to one or more wireless devices using an antenna panel comprising a plurality of antenna elements that are arranged in a hexagonal configuration, the one or more signals being transmitted using one or more directional beams for multiple-input, multiple-output communications with the one or more wireless devices and the one or more signals being transmitted based at least in part on an index corresponding to each antenna element of the plurality of antenna elements, wherein the one or more directional beams are generated based at least in part on the plurality of antenna elements arranged in the hexagonal configuration; and receiving, from at least one wireless device of the one or more wireless devices, a signal using the plurality of antenna elements of the antenna panel.

2. The method of claim 1, further comprising:

transmitting one or more reference signals to the at least one wireless device of the one or more wireless devices, wherein the one or more reference signals are transmitted using a set of two or more antenna elements from the plurality of antenna elements.

3. The method of claim 2, wherein the set of two or more antenna elements comprises one or more antenna elements associated with a first axis of the hexagonal configuration and one or more antenna elements associated with a second axis of the hexagonal configuration, the first axis being non-orthogonal to the second axis.

4. The method of claim 3, further comprising:

transmitting, to the at least one wireless device, an indication that the one or more reference signals are associated with the plurality of antenna elements arranged in the hexagonal configuration, wherein the indication comprises information associated with the set of two or more antenna elements.

5. The method of claim 4, wherein the information associated with the set of two or more antenna elements comprises separation information for the plurality of antenna elements, the index for each antenna element of the set of two or more antenna elements, or any combination thereof.

6. The method of claim 2, wherein the set of two or more antenna elements comprise one or more antenna elements associated with a third axis of the hexagonal configuration and one or more antenna elements associated with a fourth axis of the hexagonal configuration, the third axis being orthogonal to the fourth axis, and wherein the one or more antenna elements associated with the third axis are offset with respect to the one or more antenna elements associated with the fourth axis.

7. The method of claim 1, further comprising:

receiving a reference signal from a wireless device of the one or more wireless devices using two or more antenna elements of the plurality of antenna elements;

performing a measurement of a waveform corresponding to the one or more directional beams based at least in part on receiving the reference signal; and determining a phase for a three-dimensional beam corresponding to the one or more directional beams based at least in part on reciprocity between the measured waveform and the three-dimensional beam.

8. The method of claim 1, wherein the index comprises a row index and a column index.

9. The method of claim 8, wherein the row index coincides with an x-axis and the column index is projected onto the x-axis, a y-axis, or both, in a three-dimensional coordinate system.

10. The method of claim 8, wherein a phase portion of a first signal transmitted using the antenna panel comprises:

$$\exp\left[\frac{i2\pi}{\lambda}\left[r + c\cos\left(\frac{\pi}{3}\right)\right]\sin\theta_{0,x} + c\sin\left(\frac{\pi}{3}\right)\sin\theta_{0,y}\right],$$

wherein r comprises the row index, c comprises the column index, $\theta_{0,x}$ comprises a first beamforming angle of departure, and $\theta_{0,y}$ comprises a second beamforming angle of departure.

11. The method of claim 8, wherein a phase portion of a first signal transmitted using the antenna panel comprises:

$$\exp\left[-\frac{i2\pi r}{\lambda}\right],$$

wherein $r = \sqrt{z'^2 + (x-x_0)^2 + (y-y_0)^2}$, $$x = r + c\cos\left(\frac{\pi}{3}\right), \text{ and } y = c\sin\left(\frac{\pi}{3}\right),$$

and wherein r comprises the row index, c comprises the column index, and z' is associated with a location of a wireless device of the one or more wireless devices.

12. The method of claim 1, wherein each antenna element of the plurality of antenna elements that are arranged in the hexagonal configuration is separated from an adjacent antenna element by a distance comprising one half of a signal wavelength supported by the antenna panel.

13. The method of claim 1, wherein the one or more directional beams are associated with three-dimensional beamforming, angular beamforming, or any combination thereof.

14. A method for wireless communications at a first wireless device, comprising:

receiving, from a second wireless device, one or more reference signals via one or more directional beams, wherein the one or more reference signals are associated with a set of two or more antenna elements of an antenna panel of the second wireless device, the antenna panel comprising a plurality of antenna elements that are arranged in a hexagonal configuration;

performing measurements of the one or more reference signals; and transmitting, to the second wireless device, a measurement report based at least in part on the measurements of the one or more reference signals and the plurality of antenna elements arranged in the hexagonal configuration.

15. The method of claim 14, wherein the one or more reference signals associated with the set of two or more antenna elements comprise reference signals associated with one or more antenna elements associated with a first axis of the hexagonal configuration and one or more antenna elements associated with a second axis of the hexagonal configuration, the first axis being non-orthogonal to the second axis.

16. The method of claim 15, further comprising:

receiving, from the second wireless device, an indication that the one or more reference signals are associated with the plurality of antenna elements arranged in the hexagonal configuration, the indication comprising information associated with the set of two or more antenna elements, wherein the measurements are performed based at least in part on the indication.

17. The method of claim 16, wherein the information associated with the set of two or more antenna elements comprises separation information for the plurality of antenna elements, an index for each antenna element of the set of two or more antenna elements, or any combination thereof.

18. The method of claim 16, wherein the one or more reference signals associated with the set of two or more antenna elements comprise reference signals associated with one or more antenna elements associated with a third axis of the hexagonal configuration and one or more antenna elements associated with a fourth axis of the hexagonal configuration, the third axis being orthogonal to the fourth axis, and wherein the one or more antenna elements associated with the third axis are offset with respect to the one or more antenna elements associated with the fourth axis.

19. A first wireless device for wireless communication, comprising:

an antenna panel comprising a plurality of antenna elements arranged in a hexagonal configuration;

at least one processor;

memory coupled with the at least one processor; and instructions stored in the memory and executable by the at least one processor to cause the first wireless device to:

transmit one or more signals to one or more wireless devices using the antenna panel, the one or more signals being transmitted using one or more directional beams for multiple-input, multiple-output communications with the one or more wireless devices and the one or more signals being transmitted based at least in part on an index corresponding to each antenna element of the plurality of antenna elements, wherein the one or more directional beams are generated based at least in part on the plurality of antenna elements arranged in the hexagonal configuration; and receive, from at least one wireless device of the one or more wireless devices, a signal using the plurality of antenna elements of the antenna panel.

20. The first wireless device of claim 19, wherein the instructions are further executable by the at least one processor to cause the first wireless device to:

transmit one or more reference signals to the at least one wireless device of the one or more wireless devices, wherein the one or more reference signals are transmitted using a set of two or more antenna elements from the plurality of antenna elements.

21. The first wireless device of claim 20, wherein the set of two or more antenna elements comprises one or more antenna elements associated with a first axis of the hexagonal configuration and one or more antenna elements associated with a second axis of the hexagonal configuration, the first axis being non-orthogonal to the second axis.

22. The first wireless device of claim 21, wherein the instructions are further executable by the at least one processor to cause the first wireless device to:

transmit, to the at least one wireless device, an indication that the one or more reference signals are associated with the plurality of antenna elements arranged in the hexagonal configuration, wherein the indication comprises information associated with the set of two or more antenna elements.

23. The first wireless device of claim 22, wherein the information associated with the set of two or more antenna elements comprises separation information for the plurality of antenna elements, the index for each antenna element of the set of two or more antenna elements, or any combination thereof.

24. The first wireless device of claim 20, wherein the set of two or more antenna elements comprise one or more antenna elements associated with a third axis of the hexagonal configuration and one or more antenna elements associated with a fourth axis of the hexagonal configuration, the third axis being orthogonal to the fourth axis, and wherein the one or more antenna elements associated with the third axis are offset with respect to the one or more antenna elements associated with the fourth axis.

25. The first wireless device of claim 19, wherein the instructions are further executable by the at least one processor to cause the first wireless device to:

receive a reference signal from a wireless device of the one or more wireless devices using two or more antenna elements of the plurality of antenna elements;

perform a measurement of a waveform corresponding to the one or more directional beams based at least in part on receiving the reference signal; and determine a phase for a three-dimensional beam corresponding to the one or more directional beams based at least in part on reciprocity between the measured waveform and the three-dimensional beam.

26. The first wireless device of claim 19, wherein the index comprises a row index and a column index.

27. A first wireless device for wireless communication, comprising:

at least one processor;

memory coupled with the at least one processor; and instructions stored in the memory and executable by the at least one processor to cause the first wireless device to:

receive, from a second wireless device, one or more reference signals via one or more directional beams, wherein the one or more reference signals are associated with a set of two or more antenna elements of an antenna panel of the second wireless device, the antenna panel comprising a plurality of antenna elements that are arranged in a hexagonal configuration;

perform measurements of the one or more reference signals; and transmit, to the second wireless device, a measurement report based at least in part on the measurements of the one or more reference signals and the plurality of antenna elements arranged in the hexagonal configuration.

28. The first wireless device of claim 27, wherein the one or more reference signals associated with the set of two or more antenna elements comprise reference signals associated with one or more antenna elements associated with a first axis of the hexagonal configuration and one or more antenna elements associated with a second axis of the hexagonal configuration, the first axis being non-orthogonal to the second axis.

29. The first wireless device of claim 28, wherein the instructions are further executable by the at least one processor to cause the first wireless device to:

receive, from the second wireless device, an indication that the one or more reference signals are associated with the plurality of antenna elements arranged in the hexagonal configuration, the indication comprising information associated with the set of two or more 5 antenna elements, wherein the measurements are performed based at least in part on the indication.

30. The first wireless device of claim 29, wherein the information associated with the set of two or more antenna elements comprises separation information for the plurality 10 of antenna elements, an index for each antenna element of the set of two or more antenna elements, or any combination thereof.

\* \* \* \* \*